United States Patent
Wegener et al.

(10) Patent No.: US 8,151,022 B2
(45) Date of Patent: *Apr. 3, 2012

(54) COMPRESSION AND STORAGE OF PROJECTION DATA IN A ROTATABLE PART OF A COMPUTED TOMOGRAPHY SYSTEM

(75) Inventors: Albert W. Wegener, Portola Valley, CA (US); Carl R. Crawford, Bayside, WI (US); Yi Ling, Redwood City, CA (US)

(73) Assignee: Simplify Systems, Inc., Santa Clara, CA (US)

( * ) Notice: Subject to any disclaimer, the term of this patent is extended or adjusted under 35 U.S.C. 154(b) by 426 days.

This patent is subject to a terminal disclaimer.

(21) Appl. No.: 12/352,322

(22) Filed: Jan. 12, 2009

(65) Prior Publication Data

US 2010/0128998 A1    May 27, 2010

Related U.S. Application Data

(60) Provisional application No. 61/118,385, filed on Nov. 26, 2008.

(51) Int. Cl.
  *G06F 13/12* (2006.01)
  *G06F 13/38* (2006.01)
  *G06K 9/36* (2006.01)
  *G06K 9/46* (2006.01)

(52) U.S. Cl. ........... 710/68; 382/232; 382/239; 382/248

(58) Field of Classification Search ............... 710/68
  See application file for complete search history.

(56) References Cited

U.S. PATENT DOCUMENTS

| | | | |
|---|---|---|---|
| 4,982,415 A | 1/1991 | Shibata et al. |
| 5,055,821 A | 10/1991 | Keller et al. |
| 5,204,943 A | 4/1993 | Watanabe et al. |
| 5,357,549 A | 10/1994 | Maack et al. |

(Continued)

FOREIGN PATENT DOCUMENTS

JP    58019238    2/1983

(Continued)

OTHER PUBLICATIONS

Office Action Mailed Oct. 20, 2010 in co-pending related U.S. Appl. No. 12/352,116, 25 pages.

(Continued)

*Primary Examiner* — Chun-Kuan Lee
*Assistant Examiner* — Brooke Dews
(74) *Attorney, Agent, or Firm* — Haynes Beffel & Wolfeld LLP; Carolyn Koenig

(57) ABSTRACT

A method and apparatus compress projection data and store the compressed projection data in a rotatable part that is mounted for rotation within a stationary part. The data acquisition source, compressor and storage device are connected to the rotatable part. The compressor compresses projection data samples provided by the data acquisition source to form compressed packets. The compressed packets are stored in the storage device, for example one or more solid state drives mounted on the rotatable part. A data access array contains information related to the location of the stored compressed packets. Compressed packets are retrieved and transferred across the interface to the stationary part. A decompressor at the stationary part decompresses the received compressed packets to form decompressed samples of the corresponding projection data. This abstract does not limit the scope of the invention as described in the claims.

29 Claims, 15 Drawing Sheets

U.S. PATENT DOCUMENTS

| | | | |
|---|---|---|---|
| 5,615,287 A | 3/1997 | Fu et al. | |
| 5,703,965 A | 12/1997 | Fu et al. | |
| 6,144,772 A * | 11/2000 | Garland et al. | 382/239 |
| 6,259,761 B1 | 7/2001 | Lai | |
| 6,292,919 B1 | 9/2001 | Fries et al. | |
| 6,327,327 B1 | 12/2001 | Herold et al. | |
| 6,327,330 B1 | 12/2001 | Peter | |
| 6,343,109 B2 | 1/2002 | Doubrava et al. | |
| 6,433,631 B2 | 8/2002 | Pearson, Jr. et al. | |
| 6,470,065 B1 | 10/2002 | Lauther et al. | |
| 6,560,307 B2 | 5/2003 | Marume | |
| 6,671,755 B1 | 12/2003 | Leahy et al. | |
| 6,914,957 B2 | 7/2005 | Dafni et al. | |
| 7,009,533 B1 * | 3/2006 | Wegener | 341/76 |
| 7,071,852 B1 * | 7/2006 | Wegener | 341/61 |
| 7,240,251 B2 | 7/2007 | Popescu | |
| 7,248,641 B2 | 7/2007 | Schilling et al. | |
| 7,254,210 B2 | 8/2007 | Popescu | |
| 7,274,765 B2 | 9/2007 | Krumme et al. | |
| 7,327,866 B2 | 2/2008 | Bae et al. | |
| 7,502,438 B2 | 3/2009 | Nakagawa et al. | |
| 2001/0002937 A1 | 6/2001 | Warner et al. | |
| 2002/0031277 A1 | 3/2002 | Lubin et al. | |
| 2002/0097916 A1 | 7/2002 | Kaizu | |
| 2002/0102026 A1 | 8/2002 | Rijavec et al. | |
| 2002/0106130 A1 * | 8/2002 | Yokonuma | 382/232 |
| 2003/0199757 A1 | 10/2003 | Toth et al. | |
| 2003/0228041 A1 | 12/2003 | Bae et al. | |
| 2004/0022447 A1 | 2/2004 | Mukhopadhyay et al. | |
| 2004/0062341 A1 | 4/2004 | Popescu et al. | |
| 2004/0120564 A1 | 6/2004 | Gines | |
| 2004/0122968 A1 | 6/2004 | Schilling et al. | |
| 2004/0252870 A1 * | 12/2004 | Reeves et al. | 382/128 |
| 2005/0002547 A1 | 1/2005 | Torre-Bueno | |
| 2005/0033882 A1 | 2/2005 | Peyerl et al. | |
| 2006/0291731 A1 | 12/2006 | Schoisswohl | |
| 2007/0065024 A1 | 3/2007 | Todate | |
| 2007/0065032 A1 | 3/2007 | Hernandez et al. | |
| 2007/0065033 A1 | 3/2007 | Hernandez et al. | |
| 2007/0242798 A1 | 10/2007 | Popescu | |
| 2008/0075213 A1 | 3/2008 | Popescu | |
| 2008/0205446 A1 | 8/2008 | Popescu et al. | |
| 2008/0292168 A1 | 11/2008 | Winkelmann | |
| 2009/0046913 A1 * | 2/2009 | Chandra | 382/131 |
| 2009/0147908 A1 * | 6/2009 | Garms | 378/4 |

FOREIGN PATENT DOCUMENTS

| | | |
|---|---|---|
| JP | 01093864 | 4/1989 |
| JP | H4-262650 | 9/1992 |
| JP | 06030924 | 2/1994 |
| JP | 07000386 | 1/1995 |
| JP | 08084725 | 4/1996 |
| JP | 10127616 | 5/1998 |
| JP | 2003290216 | 10/2003 |
| WO | WO-2008155200 | 12/2008 |

OTHER PUBLICATIONS

Hashimoti, Masayuki, et al., "CT Image Compression with Level of Interest," 2004 IEEE Int'l Conf. on Image Processing (ICIP), 4 pages.

Manduca, Armando et al., "Histogram transformation for improved compression of CT images," SPIE vol. 3031 (1997) 320-327.

Thammineni, Arunoday, et al., "Segmentation-based CT Image Compression," SPIE Vo. 5371 (2004) 160-169.

Wegener, U.S. Appl. No. 12/208,839 entitled "Adaptive Compression of Computed Tomography Projection Data," filed on Sep. 11, 2008, 36 pages.

Wegener, U.S. Appl. No. 11/949,670 entitled "Compression and Decompression of Computed Tomography Data," filed on Dec. 3, 2007, 28 pages.

Wegener, U.S. Appl. No. 12/208,835, filed Sep. 11, 2008 entitled "Edge Detection for Cmputed Tomography Projection Data Compression," 32 pages.

International Search Report from related case PCT/US2009/058786 mailed May 3, 2010 10 pages.

Bae, Kyongtae T., et al., "CT Data Storage Reduction by Means of Compressing Projection Data Instead of Images: Feasibility Study," Radiology, vol. 219, No. 3, Jun. 2001, 850-855.

Young, Susan S., et al., "Statistically lossless image compression for CR and DR," SPIE Vo. 3658, Feb. 1999, 406-419.

Search Report Mailed Jun. 2, 2009 in PCT/US2008/085417 11 pages.

Search Report Mailed Mar. 30, 2010 in PCT/US2009/056469 10 pages.

Search Report Mailed May 24, 2010 in PCT/US2009/058777 10 pages.

Search Report Mailed May 3, 2010 in PCT/US2009/058786 10 pages.

* cited by examiner $$A = \begin{bmatrix} a11 & a12 & a13 & a14 & \cdot & \cdot & \cdot \\ a21 & a22 & a23 & a24 & & & \\ a31 & a32 & a33 & a34 & & & \\ \cdot & & & & & & \\ \cdot & & & & & & \\ \cdot & & & & & & \end{bmatrix}$$

$$B = \begin{bmatrix} b11 & b12 & b13 & b14 & \cdot & \cdot & \cdot \\ b21 & b22 & b23 & b24 & & & \\ b31 & b32 & b33 & b34 & & & \\ \cdot & & & & & & \\ \cdot & & & & & & \\ \cdot & & & & & & \end{bmatrix}$$

Figure 7

| View Index | Packet Size (kB) | Byte Offset Index (kB) |
|---|---|---|
| 1 | 67 | 0 |
| 2 | 64 | 67 |
| 3 | 75 | 67 + 64 = 131 |
| 4 | 71 | 67 + 64 + 75 = 206 |
| ⋮ | ⋮ | ⋮ |
| j | $S_j$ | $\sum_{i=1}^{j-1} S_i$ |
| ⋮ | ⋮ | ⋮ |
| M | $S_M$ | $\sum_{i=1}^{M-1} S_i$ |

Table 1

COMPRESSION AND STORAGE OF PROJECTION DATA IN A ROTATABLE PART OF A COMPUTED TOMOGRAPHY SYSTEM

CROSS-REFERENCE TO OTHER APPLICATIONS

Claim is made of the benefit of U.S. Provisional Application No. 61/118,385, filed 26 Nov. 2008.

The subject matter of this patent application is related to the subject matter of the following U.S. patent applications of the same inventors and assigned to the same assignee: U.S. patent application Ser. No. 11/949,670, filed on Dec. 3, 2007, entitled "Compression and Decompression of Computed Tomography Data," U.S. patent application Ser. No. 12/208,839 filed Sep. 11, 2008, entitled "Adaptive Compression of Computed Tomography Projection Data," and U.S. patent application Ser. No. 12/208,835, filed Sep. 11, 2008, entitled "Edge Detection for Computed Tomography Projection Data Compression."

BACKGROUND OF THE INVENTION

The present invention relates to compression and storage of projection data in the rotatable part of a computed tomography (CT) system for later transfer across the slip ring interface to the stationary part for image reconstruction.

In a CT imaging systems, multiple x-ray radiographic views of an object produce sets of projection data. Each line of projection data represents an integration of density values of internal structures within a plane, or slice, of the object. From the multiple sets of projection data, the CT imaging system produces two-dimensional (2D) cross-sectional images and three-dimensional (3D) images of the internal structures of the object. The images are obtained through application of well-known image reconstruction algorithms to the sets of projection data. The techniques that reconstruct cross-sectional images or three-dimensional images from multiple sets of projection data are broadly referred to as "tomography". Performing the image reconstruction using a programmable processor-based device is broadly referred to as computed (computerized or computer-assisted) tomography. In a typical application, a source of x-ray radiation projects x-rays through an object onto an x-ray sensor (or detector) array. The x-ray sensor outputs are digitized to form a set of projection data. The set of projection data can be one-dimensional or two-dimensional depending on the geometry of the detector array. Relative movement between one or more of the object, the x-ray source and the x-ray sensor array provides multiple views having different perspectives. An image of a slice through the object, or a cross-sectional image, can be approximated by the use of mathematical transforms of the multiple views. In certain applications, the cross-sectional images may be combined to form a 3D image of the object that may be otherwise unobservable.

A well-known application of x-ray CT is in medical CT scanners for non-invasive imaging of a human body. In medical CT scanners, multiple views are obtained by rotating the x-ray source and detector array using a gantry and transferring the projection data across the slip ring. Modern CT scanners (as of 2008) typically digitize tens of thousands of x-ray sensor outputs in the range of one to ten kilosamples per second (ksamp/sec) with each digital sample having 16 to 24 bits per sample, resulting in an aggregate data transfer bandwidth of many gigabits per second (Gbps) across the slip ring. The projection data must also be stored or buffered in real time prior to image reconstruction. The image reconstruction process is typically 10 to 20 times slower than the data acquisition process, creating the need for storage. Typical storage subsystems include redundant arrays of independent disk (RAID) drives. As data transfer rates across the slip ring increase, the storage capacity and throughput of the RAID subsystem must also increase. As the industry strives for increased spatial resolution, temporal resolution and dynamic range, the bandwidth demand for data transfer and data storage subsystems have surpassed 10 Gbps. Currently, the cost for the storage subsystem can be a significant portion, up to 40%, of the bill of materials cost of a medical CT system.

Another application of x-ray CT is in automated inspection of industrial products. For example, cross-sectional images reconstructed from x-ray projection data are used in quality control inspection systems for manufactured products including electronic devices, such as printed circuit boards. Tomography can be used to reconstruct images of one or more planes, or cross-sections, of an object under study in order to evaluate the quality of the object. The x-ray CT system acquires sets of projection data at various locations and views with respect to the object of interest. The system architectures for industrial inspection systems differ from medical CT scanners. However, like medical CT systems, large volumes of projection data require data transfer and storage. For automated inspection systems, higher throughput of the objects under test is desirable because it reduces the cost of the product being tested. A higher throughput increases the bandwidth demands for data transfer and data storage. Another example of automated inspection using CT scanning techniques is automatic baggage screening systems.

The large volumes of projection data acquired by a data acquisition subsystem of a CT system create a burden on system resources for data transfer and data storage. Limitations in data transfer bandwidth delays the availability of projection data for the reconstruction and display of an image of the object being scanned. Compressing the projection data prior to data transfer followed by decompression before image reconstruction processing reduces the burden on system resources for data transfer and storage. The benefits of compression include reducing latency between data acquisition and image display, increasing the volume of data transferred over a communication channel having limited bandwidth, and providing compressed projection data for storage and transmission over a network for later access and image reconstruction. Since compression allows the system resources to accommodate more projection data, the image resolution can be improved and/or a larger region of the object can be scanned. Compression also enables increased view acquisition rates, which is useful for imaging dynamically changing objects such as a beating human heart. The availability of computing resources to implement compression operations is also a constraint in CT systems. It is desirable that the compression operations have low computational complexity and can operate in real time to minimize the impact on computing resources.

In computed tomography, there are two domains of image-related data, the Radon transform domain and the spatial domain. The projection data, or sinogram data, are in the Radon transform domain, also referred to as the projection domain or sinogram domain. The projection data can be 2D in the situation where projection data are obtained for one slice of the object or resulting from a linear array of x-ray sensors. The projection data can be 3D in the situation where projection data are obtained for more than one slice of the object or resulting from a two-dimensional array of x-ray sensors. The 2D cross-sectional images reconstructed from the projection data are in the 2D spatial domain. A three-dimensional image reconstructed from the multiple cross-sectional images is in the 3D spatial domain. The Radon transform is the mathematical transform that underlies the relationship between the projection data in the Radon transform domain and the spatial domain image reconstructed from the projection data. Applying a compression algorithm to the projection data in the Radon transform domain will not produce the same results as applying the same algorithm to the reconstructed image in the spatial domain because of the mathematical relationship between the projection data and the reconstructed image.

Image compression techniques, for example JPEG image compression, based on standards developed by the Joint Photographic Experts Group (JPEG), are typically applied to spatial domain image data, for example photographic images. Spatial domain image compression techniques are also applied to reconstructed images in computed tomography for efficient image storage or transmission of the spatial domain image. An approach to achieve additional compression in the spatial domain image is to identify regions of interest in the image and apply lossless compression to the regions of interest and lossy compression to areas outside the region of interest. Examples of this approach are described in the article entitled, "Segmentation-based CT Image Compression" by Thammineni et al. in the Proceedings of SPIE, Vol. 5371, pp. 160-169, 2004, and in the conference paper entitled, "CT Image compression with Level of Interest," by Hashimoto et al., IEEE 2004 International Conference on Image Processing, pp. 3185-88.

For the projection, or sinogram, domain, compression and decompression of projection data are applied prior to reconstruction of an image in the spatial domain. Some approaches to compression of projection data apply a JPEG image compression method in the projection domain. An example of this approach is described by Bae et al. in U.S. Pat. No. 7,327,866 entitled, "Method and Apparatus for Compressing Computed Tomography Raw Projection Data," issued Feb. 5, 2008. This approach applies lossless or lossy compression to the projection data. An approach to compress the projection data that falls within the boundaries of object being scanned is described by Nishide et al. in the Japanese published patent application entitled, "X-Ray CT Apparatus, System and Projection Data Compressing/Restoring Method", Kokai (unexamined) Patent Publication Number 2003-290216 (P2003-290216A), published on Oct. 14, 2003. This approach separates the projection data into air information regions, where the x-rays have traversed an empty region, and subject information regions, where the x-rays have traversed the object or patient. Different compression methods are applied to the air information region and the subject information region or the air information region may be deleted.

An approach for reducing the burden on data transfer resources is to store the projection data on the rotatable part of the CT system prior to transfer across the slip ring interface to the stationary part. An example is described by Shibata et al. in U.S. Pat. No. 4,982,415 (the '415 patent) entitled "X-Ray CT Scanner Apparatus," issued Jan. 1, 1991. Shibata describes storing the projection data samples in a buffer on the rotatable part during the rotation for one scan. When the rotatable part is stopped during a rest time, a transmission unit transfers the projection data from the buffer across the slip ring to the stationary part.

Another example is described by Popescu in U.S. Pat. No. 7,254,210 (the '210 patent) entitled "Multi-slice Computer Tomography System with Data Transfer System with Reduced Transfer Bandwidth," issued Aug. 7, 2007. The CT scan protocol described in the '210 patent transfers a portion of the projection data across the slip ring during the scan and stores the remaining portion on the rotatable part. A storage unit on the rotatable part includes a fast buffer storage and permanent storage. A data administration unit determines which portion of the projection data will be transferred in real time across the slip ring and directs the remaining projection data to the storage unit. The remaining projection data are stored during the scan and later transferred during a scan pause.

Another example is described by Kanda in the Japanese Patent Application number 06-246715, Publication number JP 08-084725 (the '725 application), date of publication Feb. 4, 1996. Kanda describes storage of one or more scans in memory on the rotatable part. A controller can order transmission of the projection data from the memory to an image reconstruction processor.

The architectures described in '415 patent, the '210 patent and the '725 application exploit the gaps in projection data acquisition to transfer the projection data across the slip ring at a slower rate. They do not describe compression of the projection prior to storage on the slip ring. The disadvantages of storing uncompressed projection data are the needs for greater storage capacity and the greater access bandwidth for the storage devices. The number of storage devices needed to store uncompressed projection for one or more scans strains the limited space and power available, increasing the cost of storage on the rotatable part of the slip ring. Also, these architectures do not address the storage capacity required to store the projection data after transmission to the stationary part and prior to image reconstruction.

In the U.S. Pat. No. 7,274,765 (the '765 patent) entitled "Rotating Data Transmission Device for Multiple Channels," issued Sep. 25, 1997, Krumme et al. describe a transmission controller on the rotatable part that compresses projection data prior to conversion to serial data for transfer across the slip ring interface. A reception controller in the stationary part decompresses the compressed projection data. The '765 patent does not describe a storage device for storing compressed data on the rotatable part for later transmission to the stationary part for image reconstruction.

The commonly owned and co-pending U.S. patent application Ser. No. 11/949,670 (the '670 application), entitled "Compression and Decompression of Computed Tomography Data", filed on Dec. 3, 2007, describes techniques for compressing projection data prior to transmission across the slip ring and decompressing the compressed projection data prior to image reconstruction. The '670 application teaches classifying the projection data samples into subsets based on their significance. The compression operations applied to the subsets depend on the significance of the projection data samples. The commonly owned and co-pending U.S. patent application entitled "Adaptive Compression of Computed Tomography Projection Data," application Ser. No. 12/208, 839 (the '839 application) filed Sep. 11, 2008, describes compression techniques that adapt the attenuation of the projection data samples to achieve a desired compression ratio so that the compressed data can be transferred across the slip ring interface at a constant rate. The commonly owned and co-pending U.S. patent application entitled "Edge Detection for Computed Tomography Projection Data Compression," application Ser. No. 12/208,835 filed Sep. 11, 2008, describes determining boundaries in the projection data using derivatives and compressing the data between the boundaries. These applications describe real time, computationally efficient compression algorithms that can reduce the data transfer bandwidth requirements across the slip ring interface.

In the present application, "real time" applied to compression means that a digital signal is compressed at a rate that is at least as fast as the sample rate of a digital signal. The attribute "real time" can also describe rates for processing, transfer and storage of the digital signal, as compared to the original signal acquisition rate or sample rate. The sample rate is the rate at which an analog to digital converter (ADC) forms samples of a digital signal during conversion of an analog signal. The bit rate of an uncompressed sampled, or digital, signal is the number of bits per sample multiplied by the sample rate. The compression ratio is the ratio of the bit rate of the original signal samples to the bit rate of the compressed samples. For this application, real time refers to the rate at which the ADC forms the digital samples of projection data from the output signal of the x-ray sensor.

This description refers to lossless and lossy compression. In lossless compression, the decompressed samples have identical values to the original samples. If lossless compression does not give adequate reductions in the bit rate of the compressed samples, then lossy compression may be necessary to provide sufficient reduction of the bit rate. In lossy compression, the decompressed samples are similar, but not identical, to the original samples. Lossy compression creates a tradeoff between the bit rate of the compressed samples and the distortion in the decompressed samples.

SUMMARY OF THE INVENTION

Embodiments of the present invention have been made in consideration of the foregoing conventional problems. An object of the present invention is to provide a method to compress the projection data and store the compressed projection data in a rotatable part that is mounted for rotation within a stationary part and having an interface between the stationary part and the rotatable part, wherein a plurality of sets of projection data are provided by a data acquisition source connected to the rotatable part, wherein each set of projection data corresponds to a view angle of rotation of the rotatable part and includes an array of samples acquired for a corresponding view during a data acquisition period. The method comprises:

(a) compressing the samples of each set of projection data to form compressed samples, wherein the compressed samples for each set are arranged in at least one compressed packet, wherein each compressed packet contains the compressed samples of a corresponding portion of the projection data;

(b) storing a plurality of the compressed packets for the plurality of sets of projection data in a storage device connected to and rotating with the rotatable part, wherein each of the compressed packets is stored at a corresponding location in the storage device that is accessible based on a packet location parameter during a controllable time period;

(c) retrieving at least one of the compressed packets from the corresponding location in the storage device in accordance with the packet location parameter in response to a data access command;

(d) mapping the compressed packet retrieved from the storage device to at least one data transmission packet, wherein one or more data transmission packets contain the compressed samples of the compressed packet;

(e) transmitting the data transmission packet from a transmitter on the rotatable part to a receiver on the stationary part over a communication channel of the interface; and (f) extracting the compressed packet from the received data transmission packet to form a received compressed packet.

Another object of the present invention is to provide an apparatus to compress and store projection data in a rotatable part that is mounted for rotation within a stationary part and having an interface between the stationary part and the rotatable part, wherein a plurality of sets of projection data are provided by a data acquisition source connected to the rotatable part, wherein each set of projection data corresponds to a view angle of rotation of the rotatable part and includes an array of samples acquired for a corresponding view during a data acquisition period. The apparatus comprises:

a compressor located on the rotatable part coupled to receive the samples from the data acquisition source, the compressor forming compressed samples arranged in at least one compressed packet for each set of projection data, wherein each compressed packet contains the compressed samples of a corresponding portion of the projection data;

a storage device located on the rotatable part and coupled to the compressor, wherein a plurality of the compressed packets for the plurality of sets of projection data are stored during a controllable time period, wherein each of the compressed packets is stored at a corresponding location in the storage device that is accessible based on a packet location parameter, the storage device retrieving at least one of the compressed packets stored therein in accordance with the packet location parameter in response to a data access command;

a transmitter coupled to receive the compressed packet retrieved from the storage device, the transmitter mapping the compressed packet to at least one data transmission packet and transferring the data transmission packet over a communication channel of the interface to the stationary part; and a receiver located on the stationary part coupled to receive the data transmission packet from the communication channel of the interface, the receiver extracting the compressed packet from the data transmission packet to form a received compressed packet.

An advantage of the present invention is efficient storage of the compressed projection data in a storage device on the rotatable part of the slip ring.

Another advantage is the ease of access to stored compressed projection data in accordance with an industry standard protocol for the storage device on the rotatable part.

Another advantage is the ability to retrieve the compressed projection data on demand from the storage device on the rotatable part for image reconstruction.

Another advantage is a reduction in the capacity and cost of a stationary storage subsystem for storing compressed projection data after transfer across the slip ring interface.

BRIEF DESCRIPTION OF THE DRAWINGS

FIG. 7 illustrates an example of two arrays of attenuated samples corresponding to different sets of projection data.

DETAILED DESCRIPTION

The present invention is directed to compression and storage of projection data in the rotatable part of a computed tomography (CT) system for later transfer across the slip ring communication interface to the stationary part and decompression prior to image reconstruction. The compression and decompression of projection data is performed in the Radon transform domain, also known as the projection domain or sinogram domain. Compression of projection data allows more efficient data transfer from the data acquisition subsystem of a CT system to a storage subsystem and an image reconstruction processor. Later decompression of the compressed projection data is applied prior to image reconstruction of a spatial domain image. Compression and decompression can be applied to one set of projection data resulting from one view or to multiple sets of projection data resulting from multiple views. The present invention is independent of the number of views used by the image reconstruction processor to compute a spatial domain image and the dimensions of the set of projection data resulting from a view.

Embodiments of the present invention can be used for compressing and decompressing projection data in a medical computerized tomography scanner for generating cross-sectional images of a human body and in industrial computed tomography systems for inspecting an object under study. In medical computerized tomography scanners, an x-ray source and detector array are rotated about the patient by a rotating gantry. In an industrial computed tomography system, the x-ray source and detector array may have limited motion or remain stationary and the object under study may be translated or rotated. In both applications where the x-ray source and detector array are mounted on the rotatable part, embodiments of the present invention provide for compressing and storing projection data acquired prior to transfer over a communication channel of the slip ring to the stationary part of the gantry system. After transfer across the slip ring, the compressed projection data are decompressed prior to image reconstruction. Alternatively, the compressed projection data may be stored externally, for example in a rotating or semiconductor-based disk drive system, connected to the image reconstruction processor by another communication channel. Each communication channel and storage interface has limited bandwidth. Compression of the projection data reduces the requirements for storage capacities, storage interface bandwidths and data transfer bandwidths. Reducing these requirements reduces tomography system costs by eliminating physical transmission and storage components.

Figure 1A:
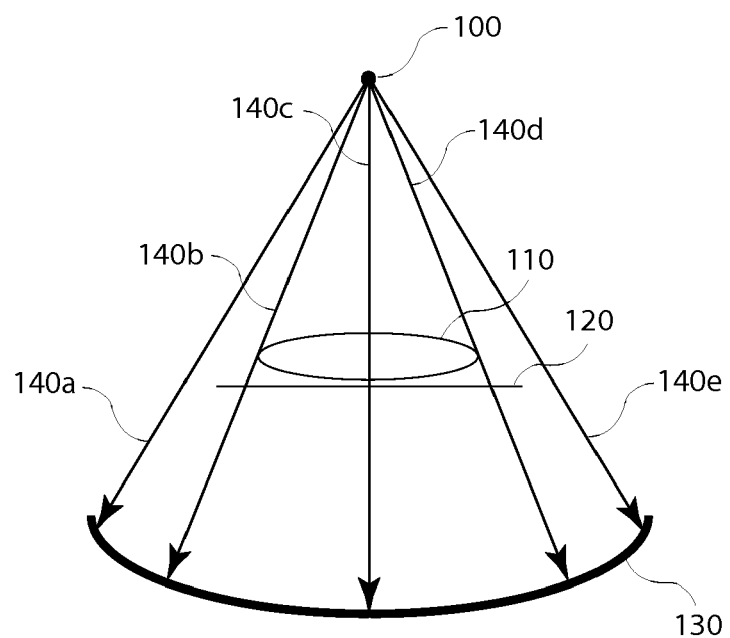
FIG. 1a is an illustration representing the basic configuration for CT scan data acquisition in a medical CT imaging system, in accordance with the prior art.

FIG. 1a is an illustration representing the basic configuration for CT scan data acquisition in a medical CT imaging system. An object or patient 110 is positioned on a platform 120 that can be moved back and forth within a rotating gantry (not shown) of a CT imaging system. The gantry includes an x-ray source 100 and a data acquisition subsystem (DAS) 130. The DAS 130 includes a matrix of one or more rows of x-ray sensors and analog to digital converters (ADCs). The ADCs digitize signals from the x-ray sensors to produce samples whose amplitudes represent x-ray counts or Hounsfield units. A present (2008) CT system can include a matrix of approximately 1024 x-ray sensors per slice, or row, and up to 320 slices per view. The x-ray source 100 generates a beam having a particular geometry, depending on the system design. The example shown in FIG. 1a has fan-beam geometry. The degree of attenuation of the x-ray depends on its path. In FIG. 1a, the rays 140a and 140e are unattenuated because they travel through the air. The ray 140c is attenuated because it is partially absorbed when traversing the object 110. The rays 140b and 140d traverse boundaries of the object 110, so they will be less attenuated than ray 140c. The array of x-ray sensors measures the received x-rays to form signals for the ADCs. The x-ray sensors of CT scanners require a dynamic range of many orders of magnitude to capture the range of attenuated and unattenuated x-ray signals from the x-ray source 100. The x-ray sensors of current (2008) CT scanners use ADCs that sample the x-ray sensor output using 16 to 24 bits per sample. For 16 bits per sample, the maximum (unattenuated) x-ray count is $2^{16}$, or 65,536. For 24 bits per sample the maximum x-ray count is $2^{24}$, or 16,777,216. For each view angle increment, the DAS 130 produces a set of projection data. The set of projection data includes an array of samples, where a line of samples in the array, or scan line, corresponds to the measurement of x-rays passing through a slice of the object 110. As the gantry rotates around the patient, multiple sets of projection data are captured and transferred across the slip ring to an external computer or processor (not shown in FIG. 1a). The processor applies an image reconstruction algorithm to the sets of projection data to form an image. The image reconstruction algorithm can produce two-dimensional cross-sectional images or three-dimensional images of the scanned object, depending on the scan protocol. The reconstructed image is then displayed for analysis. The particular geometry of the x-ray source beam, the detector geometry, DAS 130 configuration or scan protocol do not limit applications of the present invention.

Figure 1B:
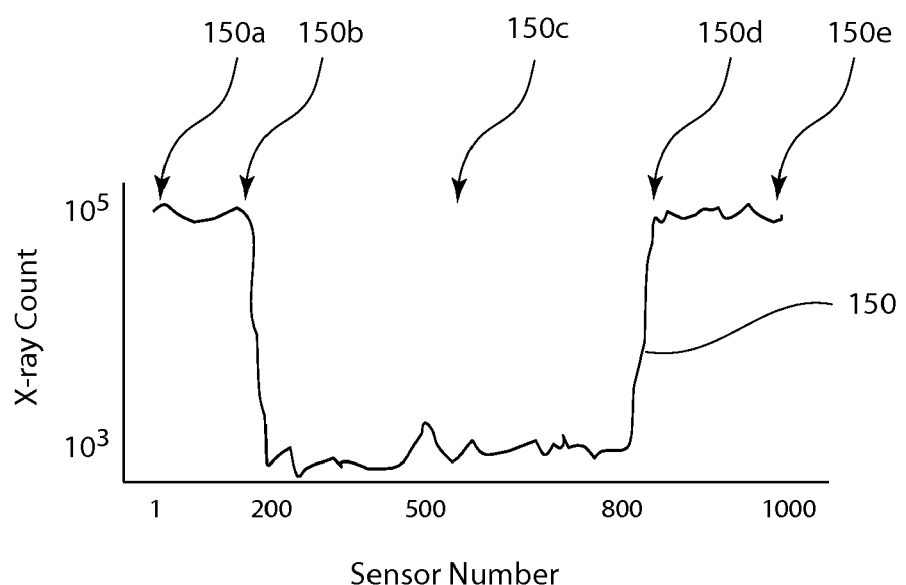
FIG. 1b illustrates an example of a signal formed by projection data output from a row of sensors, in accordance with the prior art.

FIG. 1b illustrates an example of a signal 150 formed by projection data output from a row of sensors of DAS 130. The regions 150a and 150e correspond to the unattenuated rays 140a and 140e and have the maximum x-ray counts. The regions indicated by 150b and 150d are transitional regions representing the rays detected at the boundaries 140b and 140d. The region indicated by 150c corresponds to attenuated ray 140c that has traversed the object 110 and thus has a substantially lower x-ray count. The CT systems in use typically include a matrix of sensors that is wider than the objects that are scanned, so regions with unattenuated x-rays, such as regions 150a and 150e commonly occur in projection data. In the reconstructed image, these "empty" regions correspond to regions outside the reconstructed image. The CT image reconstruction algorithms typically do not use the projection data from the empty regions 150a and 150e.

For the example of FIG. 1b, the projection data corresponding to empty space have higher values than projection data corresponding to rays traversing the object. In some CT systems, preprocessing produces projection data where samples corresponding to empty space have lower values than samples corresponding to the object. For this description, it is assumed that the indices of the samples increase from left to right. However, conventions for representing the sample coordinates do not limit the scope of the present invention.

Figure 2:
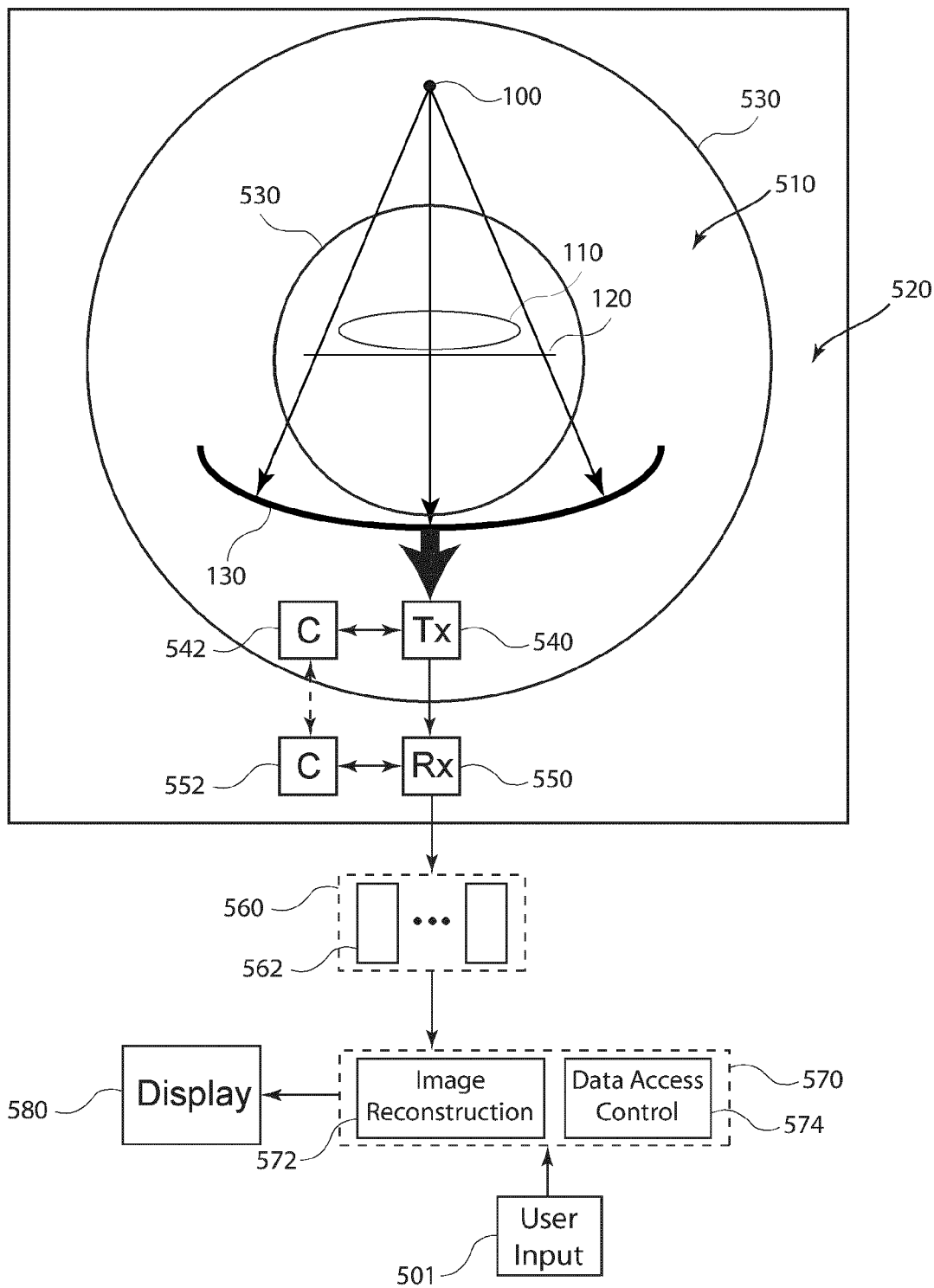
FIG. 2 is a simplified diagram of a medical CT system including a rotatable part mounted within a stationary part, in accordance with the prior art.

FIG. 2 is a simplified diagram of a medical CT system including a rotatable part 510 mounted within a stationary part 520. The rotatable part 510 carries the x-ray source 100 and the DAS 130 around the object 110 being imaged to generate a set of projection data for each view angle. Depending on the array dimensions, scan protocol and the ADC resolution, the DAS 130 can generate projection data at a rate of hundreds of megabytes per second (MBps) or more. The transmitter 540 transfers the projection data across the slip ring 530 to the receiver 550 mounted in the stationary part 520, as described below. The rotatable controller 542 is disposed on and rotating with the rotatable part 510. The stationary controller 552 is disposed on the stationary part 520. The rotatable controller 542 and stationary controller 552 control data transfer operations, such as data assembly and framing. The received projection data are stored in a storage subsystem 560, such as a RAID system that includes one or more disk drives 562. The computer 570 includes an image reconstruction processor 572 to calculate a reconstructed image from the projection data. The computer 570 also includes a data access controller 574 to retrieve the projection data from the storage subsystem 560 needed for reconstruction of the image. A file of projection data for a CT scan is typically formatted with a scan header followed by samples of the projection data set for each view of the scan. The views for a given scan will produce projection data sets having the same dimensions. The projection data set for a scan can be modeled in three dimensions, where the two-dimensional projection data array represents two dimensions and the view angle, or its temporal representation, represents the third dimension. The data access controller 574 manages file access using a standard protocol, such as the protocol for serial advanced technology attachment (SATA, or serial ATA) or serial attached small computer systems interface (SAS, or serial SCSI), to retrieve the projection data samples from the storage subsystem 560. Typically, SATA and SAS disk drive interface protocols are integrated into the chipset or on the motherboard of the computer 570. In response to commands from the data access controller 574, the projection data are transferred from the storage subsystem 560 to the image reconstruction processor 572 for image formation and display 580. In alternate embodiments, rotatable controller 542 or stationary controller 552 generate requests for projection data.

Because of the complexity of the image reconstruction computations, the image reconstruction processor 572 cannot process the projection data as fast as it is generated. A typical image reconstruction processor 572 processes the projection data at a rate of about 30 to 50 MBps. Currently, image reconstruction rates in CT systems are typically two to twenty times slower than data acquisition rates. The rate mismatch between generating projection data at hundreds of megabytes per second and processing projection data at tens of megabytes per second makes it necessary to store some or all of the projection data prior to image reconstruction. The bottlenecks for transferring the projection data in the CT system of FIG. 2 are illustrated by the following example. Assume that DAS 130 includes an array with dimensions of 100 rows with 1000 sensors per row and 2 bytes per sample. Each view generates 200 kilobytes (kB) of projection data. When the CT scanner measures 3,000 views per second, the DAS 130 outputs projection samples at a rate of 600 megabytes per second (MBps). Typically, the transmitter 540 applies 8 bit/10 bit (8B10B) encoding or 4 bit/5 bit (4B5B) encoding to the projection data prior to transfer across the slip ring 530, so that each byte of data is represented by ten bits during the transfer. For projection data generated at 600 MBps, the slip ring 530 must be capable of data transfer at a rate of at least 6 Gbps. The slip ring 530 is the first bottleneck for transport of the projection data. At the stationary part 520, the 600 MBps of projection data are transferred to the storage subsystem 560. Access to the storage subsystem 560 at a rate of at least 600 MBps for writing the projection data is the second bottleneck. The computer 570 retrieves projection data needed for reconstruction of the image at a rate of 30 MBps, which is twenty times slower than the rate of data acquisition, creating the third bottleneck. Increases in sensor array dimensions and number of view angles per scan will require greater data transfer rate and storage capacity, increasing the cost of the system.

The communication channel of the slip ring interface 530 includes one or more physical transmission channels. The physical channels can provide electrical, optical or RF transmission of projection data from the rotatable part 510 to the stationary part 520. For optical transmission, an electro-optical transducer, such as a laser diode, converts the electrical signal representing the samples to an optical signal carried via optical fiber to the slip ring interface 530 for transmission. An optical receiver on stationary part 520 includes a photodiode to convert the optical signal to an electrical signal representing the received samples. Currently an optical link provides a bandwidth of 2.5 Gbps. For an electrical transmission channel on a slip ring 530, an electrically conductive strip, or ring, usually on the rotating part is in close proximity to a secondary electrically conductive strip on the stationary part. Capacitive coupling across the small air gap between the two electrically conductive strips or rings together comprise a capacitively coupled transmission channel. Common transmission rates per capacitively coupled channel are 2 to 6 Gbps. To achieve higher data rates, multiple optical or capacitively coupled transfer units are arranged in parallel on the rotatable part and the stationary part.

The slip ring interface 530 also supports the transfer of control data between the rotatable controller 542 and the stationary controller 552. The rotatable controller 542 can transfer control data over a parallel data link operating at a lower data rate or by multiplexing the control data with the projection data for a high speed data link. The stationary controller 552 can transfer control data to the rotatable controller 542 over a parallel data link. Alternatives for transferring control data across the slip ring interface 530 are described in the '765 patent.

Figure 3:
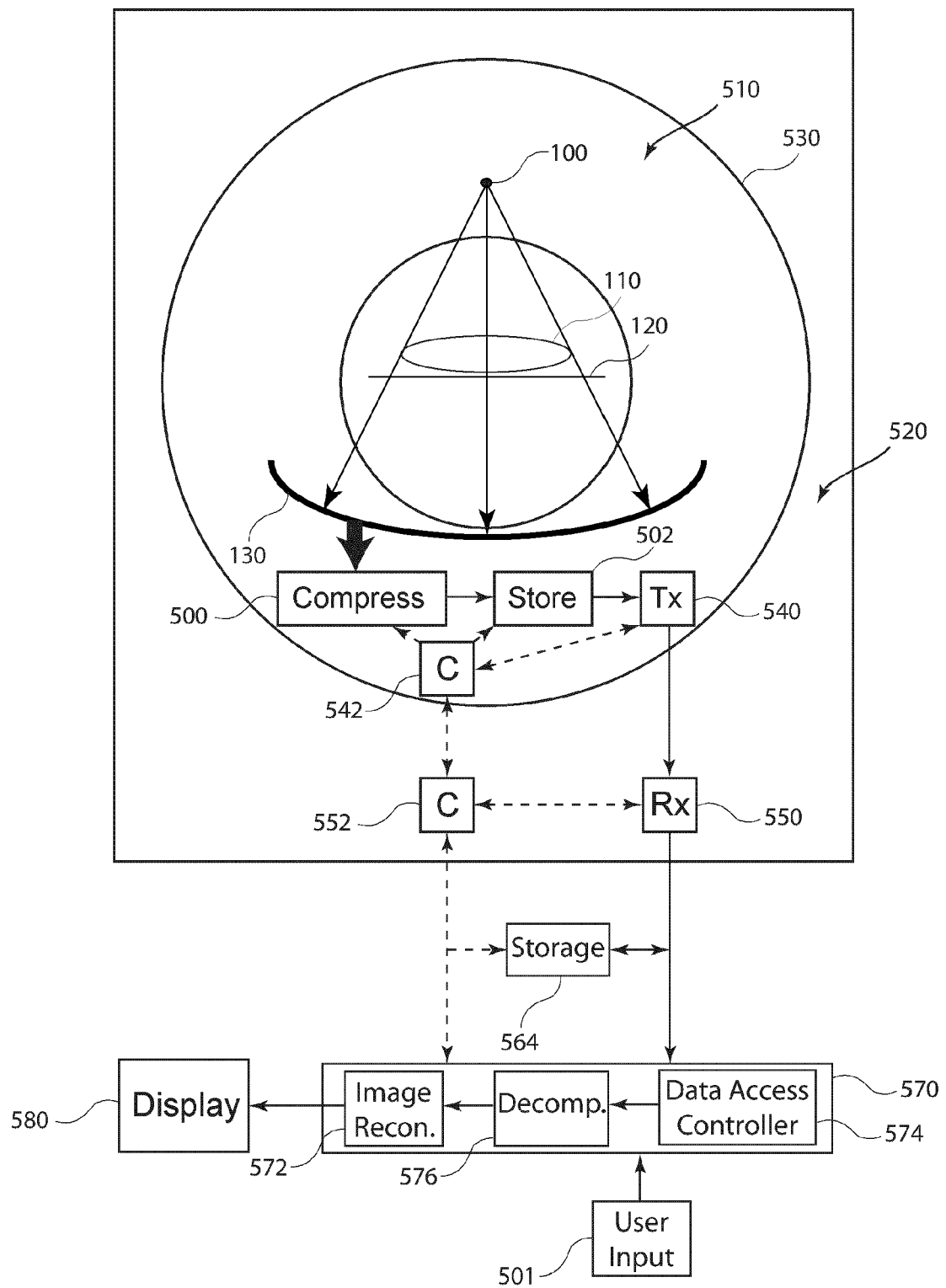
FIG. 3 illustrates an example of a CT system including compression and storage on the rotatable part, in accordance with a preferred embodiment.

The present invention addresses the problems of data transfer bottlenecks and storage capacity. FIG. 3 illustrates an example of a CT system including compression and storage on the rotatable part 510 in accordance with a preferred embodiment. The compressor 500 compresses the projection data samples output from the DAS 130 to produce compressed samples represented by a reduced number of bits. The compressed samples are then stored in the storage device 502 mounted on the rotatable part 510. The storage device 502 can store the compressed samples until they are needed by the image reconstruction processor 572. To retrieve data for image reconstruction, the data access controller 574 sends data requests to the stationary controller 552, which relays them to the rotatable controller 542. The storage device 502 retrieves the corresponding compressed samples from the storage device 502 for transmission. The transmitter 540 transfers the retrieved compressed samples across the communication channel of slip ring interface 530 to the receiver 550 on the stationary part 520. The received compressed samples are transferred via an interface to the computer 570. The decompressor 576 decompresses the received compressed samples to produce decompressed projection samples for the image reconstruction processor 572. Alternatively, a hard drive 564 can store the compressed samples after they are transferred across the slip ring interface 530 for later decompression and image reconstruction processing to support retrospective reconstruction. In medical CT, later reconstruction of an image is referred to as retrospective reconstruction In an alternative embodiment or mode of operation, the rotatable controller 542 generates data requests from the storage device 502 instead of the data access controller 574. The rotatable controller 542 is aware of both the timing and amount of compressed projection data stored in the storage device 502. The stationary controller 552 and/or data access controller 574 respond to the flow of compressed projection data that they did not directly request. The timing of data requests is further described below with respect to FIG. 13. The source of the data requests can be the rotatable controller 542, the stationary controller 552 or the data access controller 574 depending on the scan protocol. Certain CT scan protocols benefit from acquisition-driven data requests generated by the rotatable controller 542. Other CT scan protocols benefit from image reconstruction-driven data requests generated by the data access controller 574 or by the stationary controller 552. A combination of the data access controller 574, stationary controller 552 and rotatable controller 542 can also generate the data access requests to support a scan protocol.

Compression decreases the number of bits representing the projection data for a given scan protocol, conserving the data transfer and storage resources of the system. The capacity of the storage device 502 can be reduced, conserving space and power on the rotatable part 510. The communication bandwidth of slip ring interface 530 can be reduced. The capacity and access bandwidth of the storage subsystem 560 (FIG. 2) can be reduced so that a hard drive 564 (FIG. 3) can replace a costly RAID system. All of these reductions result in cost savings for the CT system.

A preferred embodiment of the storage device 502 is implemented by one or more solid-state drives (SSD), depending on the desired storage capacity and read/write speeds. Current SSD technology provides data storage capacities of tens to 256 gigabytes and sequential read/write speeds of tens to 250 MBps. SSDs using non-volatile flash memory have important advantages for a CT system including lower power consumption and the ability to retain data during a power outage. The latter is especially important for a medical CT system, in which the patient has been exposed to radiation. Another advantage is that SSDs comply with industry standards for storage device interfaces, such as SATA (serial ATA) or SAS (serial attached SCSI). These standards include the physical and electrical specifications for the connectors and command sets for software implementations of data access. The SATA protocol is currently implemented in many commercial SSD products. It is commonly used in personal computer (PC) systems and was originally developed to improve data transfer between the PC's motherboard and hard disk drives. The SATA command protocol is based on addressing sectors, or blocks, of a fixed number of bytes of data, typically 512 bytes. The SATA protocol simplifies the integration of one or more SSDs as storage devices 502 on the rotatable part 510 of the CT system. Furthermore, a SATA compatible data transfer interface between the stationary part 520 and the computer 570 standardizes and simplifies the transfer of the compressed projection data for image reconstruction. Another important advantage is that the industry standard protocol allows the access to projection data in the storage device 502 to be transparent to the computer 570. The data access controller 574 simply issues commands according to the protocol as if it were accessing an ordinary hard disk drive. The storage device 502 incorporating an industry standard protocol, available at present time or in the future, greatly simplifies access to compressed projection data across the slip ring interface 530. The embodiments of the storage device 502 described below are compatible with the SATA protocol. However, alternative embodiments of the storage device 502 can be compatible with the SAS protocol, another industry standard protocol or a proprietary protocol. An alternative to non-volatile flash memory for the storage device 502 is battery backed dynamic random access memory (DRAM).

The write speed of the SSD determines a lower bound on number of parallel SSDs needed to receive the projection data samples in real time. For example, for projection data generated at a rate of 600 MBps and an SSD having a maximum sequential write speed of 100 MBps, writing uncompressed projection samples to the SSDs in real time requires at least six parallel SSDs. For a 2:1 compression ratio, the compressed samples are generated at 300 MBps, reducing the number of parallel SSDs to at least three. The preferred embodiment of the compressor 500 produces the compressed samples in real time, or as fast as the projection data samples are produced by the ADCs in the DAS 130. Real-time operation of the compressor 500 can reduce the number of parallel SSDs receiving the compressed samples. A disadvantage of compressing samples at less than real-time rates is the need for temporary buffering of projection data samples until they can be compressed.

Preferred embodiments of the compressor 500 and the decompressor 576 apply the techniques described the '839 application. Greater savings in bandwidth and storage capacity can be realized when the compressor 500 compresses the projection data samples in real time. Future advancements in real-time compression will be achieved by both improved compression algorithms and improved integrated circuit technology that increase the speed of compression operations. These advancements will provide additional alternatives for the compressor 500 and decompressor 576. The compression technique applied by the compressor 500 and decompression technique applied by the decompressor 576 do not limit the scope of the present invention, as described in the claims.

Figure 4:
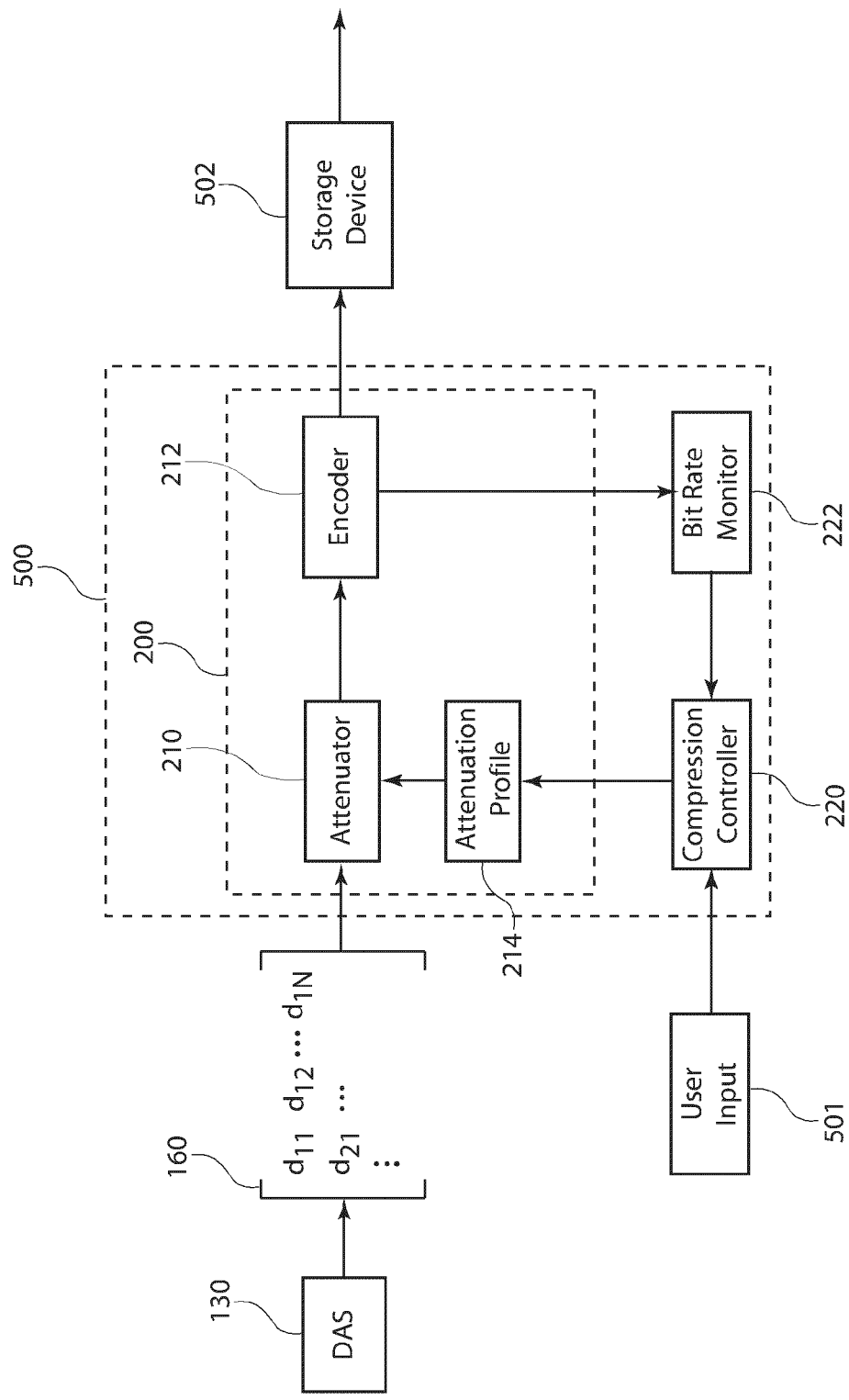
FIG. 4 is a block diagram of a preferred embodiment for the compressor on the rotatable part.

FIG. 4 is a block diagram of a preferred embodiment for the compressor 500. The DAS 130 generates a set of projection data 160 for each view. The set of projection data 160 comprises an array of projection data samples. The array geometry depends on the data acquisition process and does not limit the scope of the present invention. The array of projection data 160 includes projection data samples $d_{11}$, $d_{12}$, etc., having associated coordinates, or indices. A preferred embodiment of the compressor 500 includes the compression processor 200, compression controller 220 and bit rate monitor 222. In an alternative embodiment, the functions of the compression controller 220 are implemented in the rotatable controller 542. The compression processor 200 compresses the projection data samples of the array 160. The attenuator 210 reduces the magnitudes of the samples in each line, or row, of the array 160 in accordance with parameters of the attenuation profile 214. The attenuation profile 214 depends on the coordinates of the samples in the array 160 and provides attenuation values that are less than or equal to one. The magnitude of an attenuated sample is either reduced or remains at the original value, depending on the attenuation profile 214. The attenuator 210 essentially reduces the dynamic range of the attenuated samples so that they can be represented using fewer bits which increases the compression ratio. The encoder 212 packs the attenuated samples using lossless or lossy encoding, as described further below. The encoder 212 provides the compressed samples to the storage device 502. The compression controller 220 uses feedback information from the encoder 212 for feedback control of the output bit rate. The feedback information can be any measure related to the number of bits in the compressed samples, including the bit rate of the compressed data, number of bits per compressed sample or sizes of packets of compressed data. The compression controller 220 uses feedback information to adjust the compression control parameters, including parameters of the attenuation profile 214, so that the compressed data bit rate, or number of bits per compressed sample, remains constant or falls within a desired range. The compression control parameters, including parameters corresponding to the attenuation profile 214, can be encoded and included with the compressed data and later used for decompression control. The compression controller 220 can also receive user input 501, such as a desired output bit rate or compression ratio for the compressed data or desired signal quality of the decompressed projection samples. The user input 501 can also select the desired type compression operations and the control parameters.

The compressor 500 provides lossless or lossy compression according to the user input 501. For lossless compression of the projection data samples, the attenuator 210 is bypassed, or the attenuation profile 214 is set to 1 for all indices (i,j) corresponding to the projection data samples in the array 160. The compressor 500 can include edge detection to remove samples corresponding to empty space, as described below, and lossless compression of samples corresponding to the object 110 being imaged. The compressor 500 generates packets of compressed samples, or compressed packets, where each compressed packet corresponds to a portion of the projection data. Lossless compression produces compressed packets having varying sizes because the amount of compression depends of characteristics of the corresponding portion of the projection data. Lossy compression can be combined with feedback control to achieve a fixed compression ratio or a limited range of compression ratios selected by the user. The resulting compressed packets will have the same size or a limited range of sizes.

The attenuation profile 214 includes parameters that determine the degree of attenuation applied by the attenuator 210 to the samples in the array 160. A preferred type of attenuation profile 214 is represented by a function having segments that are exponential functions of base 2. In one alternative, the attenuation profile 214 provides decreasing attenuation from the boundaries of each line of the array 160 towards the center. For example, assume that the coordinates for the $i^{th}$ line, or row, in the array 160 $d_{ij}$ extends from j=1 to j=N, where N represents the number of X-ray sensors in a row of DAS 130. For example, in a current (2008) CT system, the array can have lines with up to 1024 elements per line, or row. An exponential attenuation profile provides attenuation as a function g(j) of the sample coordinate j, given by:

$$g(j)=2^{-y(j)} y(j) \geq 0 \qquad (1).$$

The attenuation profile 214 represented by g(j) includes an exponent function y(j). Since the exponent is negative in equation (1), multiplying the samples by the values of the function g(j) reduces the magnitudes of the samples, unless y(j)=0. The exponent function y(j) is the negative $\log_2$ of the attenuation profile represented by g(j). The number of bits (including fraction of a bit) needed to represent the $j^{th}$ attenuated sample is less than that of the $j^{th}$ unattenuated sample by the $j^{th}$ value of the exponent function y(j).

Figure 5A:
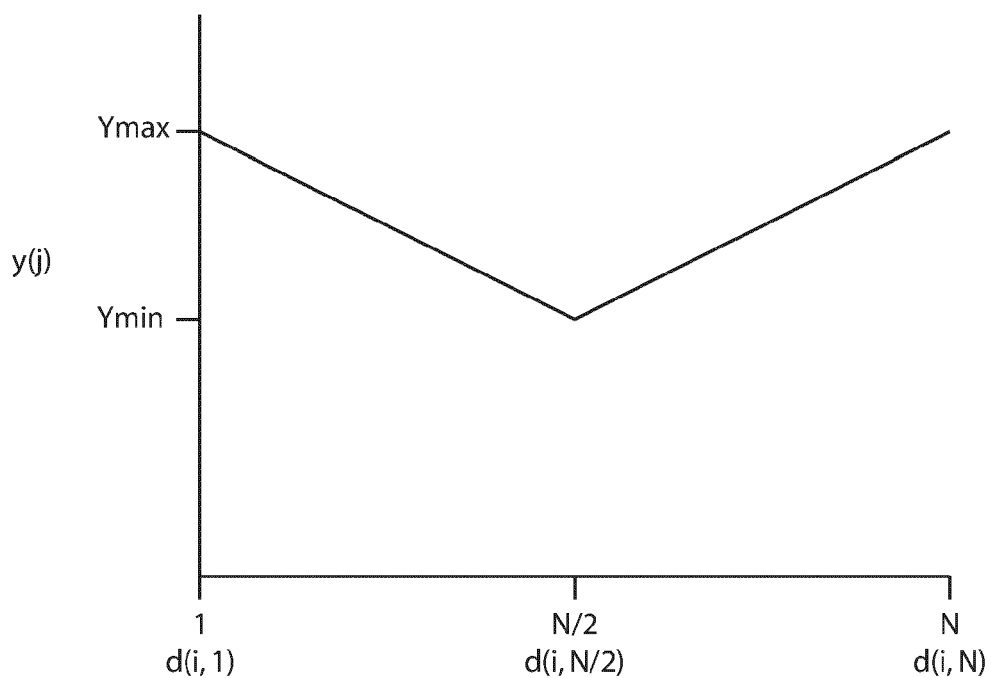
FIG. 5a shows an example of an exponent function y(j) of the attenuation profile given by the function $g(x)=2^{-y(j)}$.

FIG. 5a shows an example where the exponent function y(j) comprises segments that are linear functions of the index j. The y-axis indicates the number of bits (including fraction of a bit) of reduction in the magnitude of the $j^{th}$ sample. The parameter Ymax will produce the maximum attenuation, given by:

$$g_{max}=2^{-Ymax} \qquad (2).$$

The symmetric exponent function shown in FIG. 5a would apply the maximum attenuation to the samples d(i,1) and d(i,N) in the $i^{th}$ line of the array 160. The value of Ymax is less than or equal to the bit precision of the projection samples produced by the DAS 130 and can be selected to achieve a target output bit rate of the compressed data, as described below with respect to FIG. 8. For example, when 20 bit samples are produced by the DAS 130, the value of Ymax is 20 or less. A lower value of Ymax, such as 10 for the 20 bit samples, produces lower attenuation resulting in less compression. The parameter Ymin corresponds to the minimum attenuation, given by $$g_{min}=2^{-Ymin} \qquad (3).$$

Figure 5B:
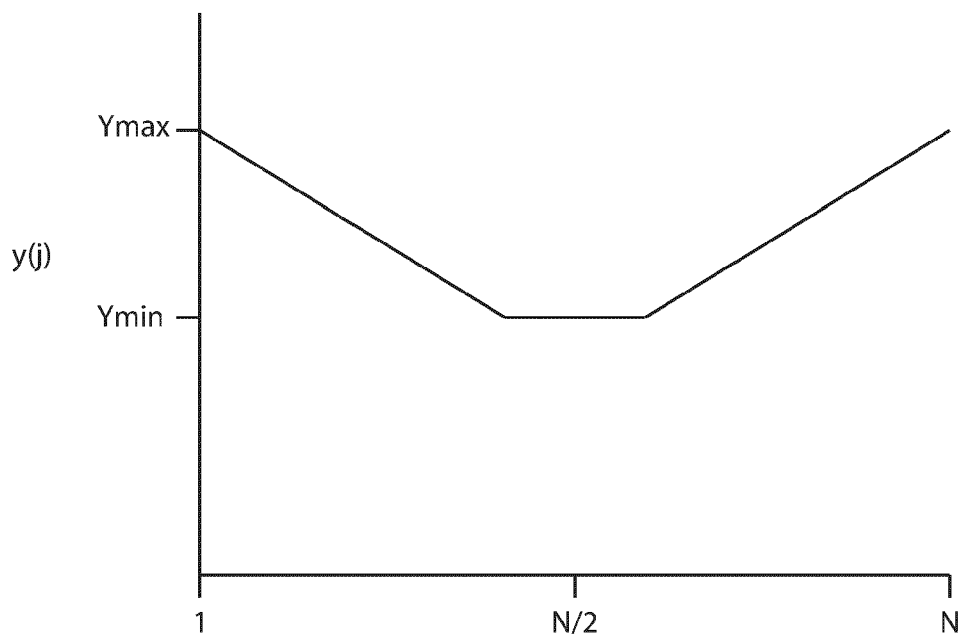
FIG. 5b shows another example of an exponent function y(j) of the attenuation profile given by the function $g(x)=2^{-y(j)}$.

For Ymin=0, the magnitude of the center sample corresponding to d(i,N/2) in FIG. 5a would be unchanged, since its value is $2^0=1$. The value of Ymin can also be adjusted to achieve a target output bit rate, as described below with respect to FIG. 8. Another example for the exponent function includes multiple linear segments, as shown in FIG. 5b. Alternatively, the exponent function can have segments that are nonlinear functions of the sample coordinates.

The attenuation profile can be represented by linear, exponential, parabolic, staircase, dithered or other nonlinear segments. Also, the attenuation profile need not be symmetric nor have its minimum value at the center (N/2) element of the N-length line of array 160. Preferably, the attenuation profile provides gradual changes from sample to sample. It has been observed that a change in the attenuation profile between samples that is greater than one bit can cause ring artifacts in the reconstructed image. For some non-medical CT applications, the ring artifacts may be tolerable. For medical CT, the ring artifacts can be prevented. To prevent the ring artifacts, an attenuation profile represented by g(j) should change by less than one bit per sample index j. This constraint is also represented as follows:

$$\text{Abs}[\log_2(g(j))-\log_2(g(j+1))]<1.$$

For g(j) represented in equation (1), the magnitudes of the slopes of the line segments for y(j) must be less than or equal to one to meet this constraint. The examples of FIGS. 5a and 5b meet this constraint. This constraint can also be expressed using units of decibels (dB). One bit represents 6 dB of attenuation, so an attenuation step of less than 6 dB per sample index meets the above criteria. For example, an attenuation step of 0.375 dB corresponds to 1/16 bit, and it has been observed that ring artifacts apparent with attenuation steps of 6 dB are not present when the attenuation step is reduced to 0.375 dB. Accordingly, the critical attenuation step will depend on the application of the CT imaging. In high resolution CT systems, a critical attenuation step to avoid ring artifacts can be less than 1 dB. The magnitude of the attenuation step is inversely related to the compression ratio that can be achieved. Therefore, for systems requiring a compression ratio of at least 2 to 1, higher attenuation steps are suggested. It is discovered that significant compression is achievable using the attenuation and encoding technology described herein, while maintaining a smoothly reconstructed image in high resolution CT systems for medical imaging.

For many applications, the user can select lossless compression, where the attenuator 210 is bypassed or the values of attenuation profile 214 are set to 1. Lossless compression ratios between 1.5:1 and 2:1, for example, can significantly improve the CT system's capacity to store and transfer compressed projection data. For other applications, the user can select lossy compression to provide greater compression ratios while maintaining sufficient quality of the image reconstructed from the corresponding decompressed projection samples. The preferred embodiment the compressor 500, described herein, includes lossy compression that reduces artifacts in the image reconstructed from the corresponding decompressed projection samples to an unobservable or acceptable level. The additional lossy compression, for example corresponding to compression ratios of 2:1 or greater, can further improve the CT system's capacity, while providing a reconstructed image with sufficient quality.

A preferred attenuation profile applies greater attenuation to samples near the edges of the array 160 and lower or no attenuation to samples near the center of the array in order to preserve the accuracy of the central area of the reconstructed image. When the attenuation of the samples results in lossy compression, the accuracy of the central area of the reconstructed image is preserved, while the error may be increased in the peripheral area. The attenuation profile values may be the same for all the lines, or rows, of the array. Alternatively, the attenuation profile values may vary for the different lines, or rows, of the array or for the different projection data sets.

The attenuator 210 applies the attenuation profile 214, such as that represented by equation (1), by multiplying and/or shifting the samples by the corresponding attenuation values. Multiplying along with shifting allows fractional attenuation values in the floating point range {0.0, 1.0}. For example, representing the floating point attenuation values of the attenuation profile using M bits provides $2^M$ attenuation values in the range {0.0, 1.0}. The attenuation values themselves can be stored in a lookup table in memory and provided to the attenuator 210. Alternatively, the attenuator 210 can calculate the attenuation values using parameters defining the attenuation profile 214, such as slopes and segment endpoints, stored in memory. A simple embodiment of the attenuator 210 includes right shifting the samples by the number of bits corresponding to the attenuation values. Shifting alone reduces the magnitudes of the samples by factors of 2, since a right shift corresponds to a division by two. When the attenuation profile 214 corresponds to an exponential function of base 2 as in equation (1), the exponent function y(j) can be truncated or rounded to determine a whole number of right shifts. The right shifts will remove a corresponding number of least significant bits, thus reducing the number of bits used to represent the sample. The right shift values corresponding to the attenuation values can be stored in a lookup table or calculated by the attenuator 210 based on parameters of the attenuation profile 214.

The encoder 212 further reduces the number of bits representing the attenuated samples to produce the compressed samples. The encoder 212 can apply block floating point encoding, Huffman encoding or other bit packing method. Alternatively, the attenuated samples can be packed sequentially, since the number of bits per sample is a known function of sample index as represented by the attenuation profile. For example, for the attenuation profile 214 represented by equation (1), the number of bits for the $j^{th}$ sample is reduced by the rounded or truncated value of y(j) so that the number of bits for each compressed sample is known as a function of the sample index j.

The encoder 212 can apply block floating point encoding, which can be lossless or lossy. The preferred block floating point encoding divides each line of samples to be encoded into groups of N_GROUP samples and applies the following steps.

For the first group of samples:
1) Determine the exponent (base 2) for the sample with the maximum magnitude, such as by calculating the $\log_2$ of the maximum magnitude in each group of N_GROUP samples. This indicates the number of bits per encoded sample, or n_exp(0).
2) Absolute encode the exponent n_exp(0) of the first group using S bits.
3) Encode the N_GROUP samples using n_exp(0) bits per sample.

For the $i^{th}$ group of N_GROUP samples (i>0):
4) Determine the $i^{th}$ exponent (base 2) for the sample with the maximum magnitude, which indicates the number of bits per encoded sample in the $i^{th}$ group, or n_exp(i);
5) Differentially encode the $i^{th}$ exponent by subtracting n_exp(i) from n_exp (i−1) to determine an $i^{th}$ difference value. Encode the $i^{th}$ difference value using a corresponding token, where shorter tokens represent more common difference values and longer tokens represent less common difference values.
6) Encode the $i^{th}$ group of N_GROUP samples using n_exp (i) bits per sample.

For the first group of samples, the exponent n_exp(0) is directly encoded. For example, the exponent n_exp(0) can be encoded as follows, where S is the original number of bits per sample:

| | | |
|---|---|---|
| a. | 0: | n_exp(0) = 0 (all 4 sample values are zero) |
| b. | 1: | n_exp(0) = 2 (2 bits per sample) |
| c. | 2: | n_exp(0) = 3 (3 bits per sample) |
| d. | etc. until S − 1: | n_exp(0) = S (S bits per sample). |

For the $i^{th}$ group, the exponent n_exp(i) is differentially encoded using a prefix code, where no codeword is the prefix of another codeword. The preferred differential encoding is as follows:

1. Calculate difference: e_diff = n_exp(i) − n_exp(i − 1)
2. Encode e_diff as follows:
    a. 0:    e_diff = e(i) − e(i − 1)

| b. | 101: | e_diff = +1 |
| c. | 110: | e_diff = −1 |
| d. | 1001: | e_diff = +2 |
| e. | 1110: | e_diff = −2 |
| f. | Etc. | |

An alternative lossy encoding method provides separate encoding of the mantissas and exponents of the sample values. Encoding the mantissas and exponents separately can provide additional compression and reduce the effects of lossy compression error. In this method, the difference values of the exponents of consecutive samples are calculated to determine exponent difference values. The exponents vary slowly, so there are relatively few nonzero values separated by strings of zero values. The exponent difference values can be efficiently encoded by representing only the nonzero difference value and their corresponding positions. The position can be represented by the corresponding index value or relative to the position of last nonzero difference value. Encoding of the exponent difference values is lossless, which prevents relatively large errors. Encoding of the mantissas can be lossy. For decoding the exponents, the exponent values are reconstructed by integrating the exponent difference values and decoding the corresponding position locations. When decoding the mantissas, each reconstructed mantissa value is restricted to so that it does not change the value of the corresponding exponent of the decoded sample. For a decoded exponent of n_exp, the reconstructed mantissa can have a maximum value of $2^{n\_exp}-1$. This prevents lossy compression error in the mantissa from changing the value of the exponent.

Figure 6:
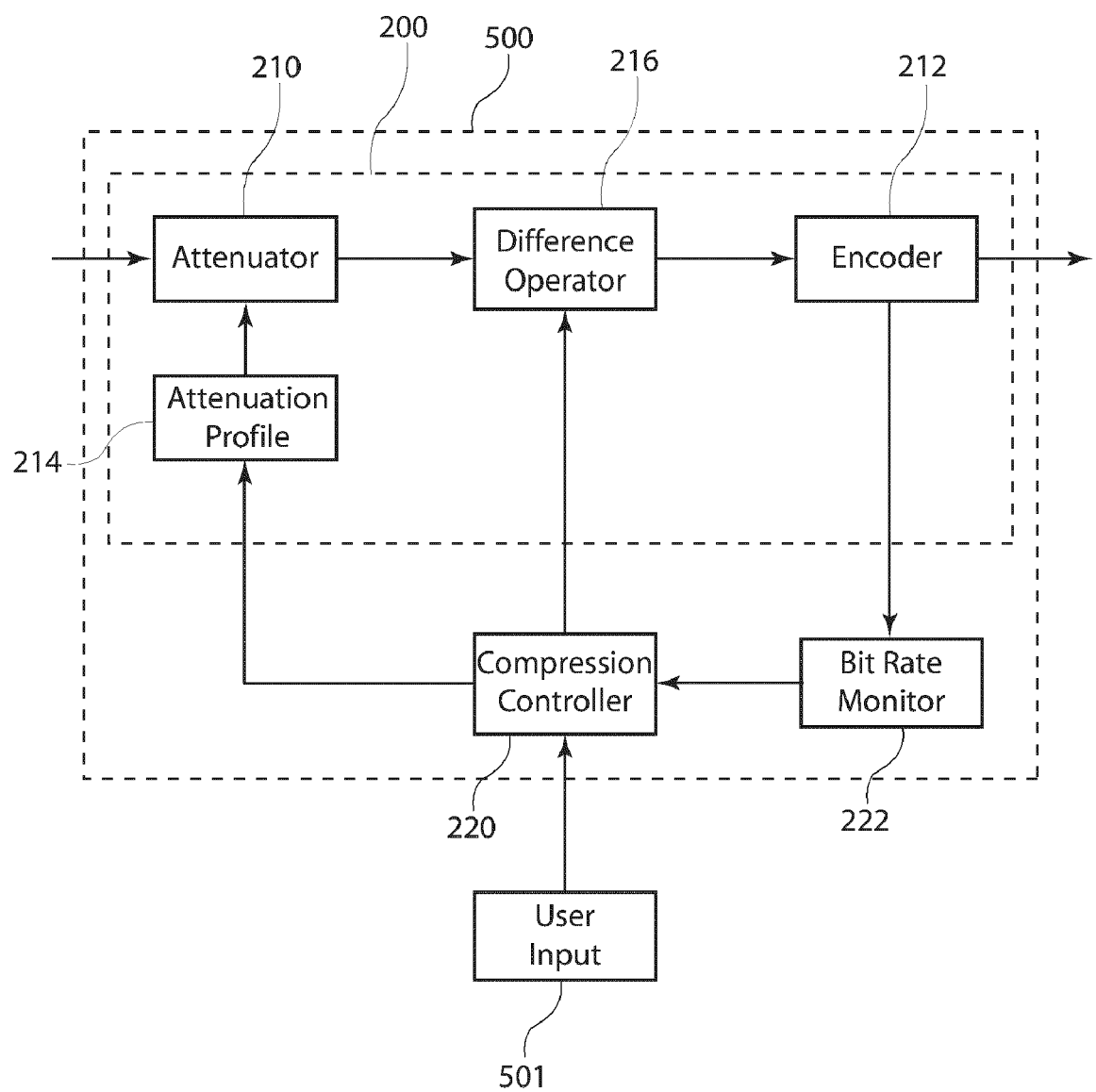
FIG. 6 is a block diagram of a compressor for projection data that includes a difference operator.

Differential encoding of the attenuated samples prior to block floating point or other encoding can provide additional compression. For differential encoding, the compression processor 200 includes a difference operator 216, as shown in FIG. 6. The difference operator 216 calculates first or higher order differences of the attenuated samples. The difference operator 216 has the following alternatives for calculating differences:

1) Calculating differences between consecutive attenuated samples of the same line (row), producing sample-by-sample differences or column-by-column differences;
2) Calculating differences between attenuated samples in consecutive lines (rows) of the same set of projection data, producing row-by-row differences or slice-by-slice differences;
3) Calculating differences between the attenuated samples in corresponding positions of consecutive sets of projection data, producing projection-by-projection differences or view-by-view differences.

FIG. 7 illustrates an example of two arrays, A and B, of attenuated samples corresponding to different sets of projection data. For the first alternative the difference operator calculates differences between consecutive samples in the same line, or row. For example for the first row of array A, differences calculated between attenuated samples include:

$$\text{Diff3} = a_{14} - a_{13} \tag{4}$$

$$\text{Diff2} = a_{13} - a_{12} \tag{5}$$

$$\text{Diff1} = a_{12} - a_{11} \tag{6}$$

For calculating differences between attenuated samples in different rows of the same set of projection data, an example for array A is as follows:

$$\text{Diff1} = [a_{21}a_{22}a_{23}a_{24}\ldots] - [a_{11}a_{12}a_{13}a_{14}\ldots] \tag{7}$$

$$\text{Diff2} = [a_{31}a_{32}a_{33}a_{34}\ldots] - [a_{21}a_{22}a_{23}a_{24}\ldots] \tag{8}$$

For calculating differences between corresponding attenuated samples of different sets of projection data, an example is as follows:

$$\text{Diff1} = B - A \tag{9}$$

For second order differences, the difference operator 216 calculates the following for the respective examples:

$$S\text{diff1} = \text{Diff2} - \text{Diff1} \tag{10}$$

$$S\text{diff2} = \text{Diff3} - \text{Diff2} \tag{11}$$

For third order differences, the difference operator calculates the following for the respective examples:

$$T\text{diff1} = S\text{diff2} - S\text{diff1} \tag{12}$$

Referring to FIG. 6, the compression controller 220 provides control parameters that configure the difference operator 216 to perform the desired calculations. The compression controller 220 can respond to user input 501 to set values of the control parameters. For example, the user can select options for the difference operator, such as selecting first or higher order difference operations or selecting lossless or lossy difference operations. The difference values can be quantized to fewer bits for additional bit reduction that is lossy. The encoder 212 applies block floating point encoding, Huffman encoding or other bit packing method (lossless or lossy), as described above, to the difference samples.

For feedback control of the difference operator 216, the compression controller 220 can dynamically select one of the differencing alternatives described above based on feedback from the bit rate monitor 222. The difference operator 216 calculates differences for each of the differencing alternatives. The bit rate monitor 222 determines the sizes of the compressed samples for the three differencing alternatives. The compression controller 220 selects the differencing alternative that minimizes the size of compressed samples. For example, for a given projection data set, the difference operator 216 calculates the sample-by-sample differences for samples in the same line, the line-by-line differences between samples in adjacent lines and projection-by-projection differences between samples in consecutive views. The alternative that produces the difference samples that minimize the number of bits for encoding is selected for the given projection data set. This selection can apply to the one projection data set or to group of projection data sets. When the encoder 212 applies block floating point encoding to the difference samples, as described above, the number of bits can be estimated by calculating the following for the difference samples resulting from each of the differencing alternatives:

1) For the ith group of N_GROUP difference samples, the number of bits for encoding the N_GROUP difference samples is n_exp(i) multiplied by N_GROUP;
2) For the ith group, the number of bits for encoding the exponent n_exp(i) using differential encoding for the exponent described above;
3) Add the numbers calculated in steps 1 and 2 for all the groups of N_GROUP difference samples corresponding to the set of projection data to compute the total number of bits in the packet for the differencing alternative.

The above steps can be performed without actually packing the compressed bits. The alternative that minimizes total number bits is selected for encoding the given projection data set or a group of projection data sets. The resulting difference samples for the projection data set are encoded and packed to form the packet of compressed samples. A control parameter associated with the packet indicates which of the differencing alternatives was applied to the corresponding projection data samples. As described below with respect to FIG. 12, the control parameter will be used by the decompressor 576 to configure the integration operator 416.

Figure 8:
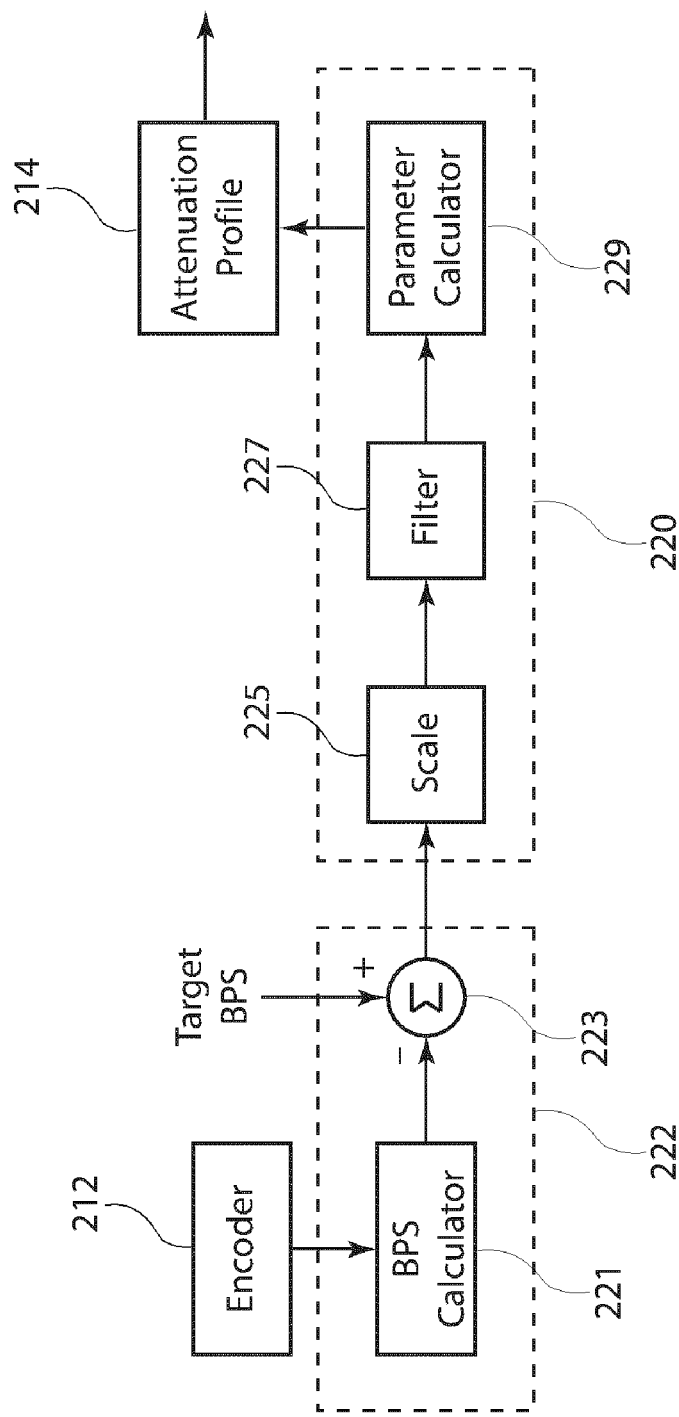
FIG. 8 is a block diagram showing the interactions of the various elements for controlling the average bits per compressed sample.

Feedback control can also be configured to control the output bit rate of the compressed samples. The bit rate monitor 222 calculates the average bits per sample for a group of compressed samples. The average number of bits per compressed sample is compared to a desired value or range of values selected by the user. If the average number of bits per compressed sample is outside the range, the compression controller 220 can adjust parameters of the attenuation profile 214 to reduce or increase the output bits per sample. For example, referring to FIG. 5a, to reduce the output bits per sample, the parameter Ymax can be increased, making the slopes of the line segments steeper to provide increased attenuation of the samples. The bit rate monitor 222 can calculate other measures of compression performance, such as compression ratio, bit rate or compressed packet size. The bit rate monitor 222 can calculate the average number of bits per group of compressed samples where the size of the group is selected by the user. For example, the group of compressed samples can correspond to a row of samples in array 160, the entire array 160 corresponding to a single view, or a number of arrays 160 corresponding to multiple views. Calculating an average number of bits smoothes out small variations in compressed packet sizes FIG. 8 is a block diagram showing the interactions of the various elements for feedback control of the output bit rate to a target value. The bit rate monitor 222 receives compressed bit rate or compressed packet size information from the encoder 212, such as bits per packet or samples per packet. The bits per sample calculator 221 calculates the average number of bits per sample for a set of compressed samples. Preferably, the set of compressed samples corresponds to a set of projection data. The subtractor 223 subtracts the average bits per sample from the target, or desired, bits per sample to give an error value. A scale factor 225 and a filter 227 are applied to smooth the error values. The values of the scale factor 225 and filter coefficients can be specified by the user to control the response time, or time constant, of the feedback loop. The parameter calculator 229 modifies parameters of the attenuation profile 214 based on the smoothed error values. In one approach, the parameter calculator 229 sets the parameters of the attenuation profile 214 so that the mean value of bits reduced per sample approximately equals the smoothed error value. For example, for the attenuation profile 214 represented by equations (1) to (3), the parameter calculator 229 adjusts the values of parameters Ymax and Ymin of the function y(j). Referring to FIG. 5a, the mean value is given by:

$$\text{mean} = (Y\text{max} + Y\text{min})/2 \tag{13}$$

To reduce the bits per sample by an amount r, the parameters Ymax and Ymin can be adjusted so that the new mean value, mean(2), is increased by the amount r from the old mean value, mean(1).

$$\text{mean}(2) = \text{mean}(1) + r \tag{14}$$

$$= [Y\text{max}(1) + Y\text{min}(1) + 2r]/2. \tag{15}$$

Equation 15 shows three alternatives for adjusting Ymax and/or Ymin to increase the mean by an amount r:

1) Set $Y\text{max}(2) = Y\text{max}(1) + 2r$ and $Y\text{min}(2) = Y\text{min}(1)$; (16a)

2) Set $Y\text{max}(2) = Y\text{max}(1) + r$ and $Y\text{min}(2) = Y\text{min}(1) + r$; (16b)

3) Set $Y\text{max}(2) = Y\text{max}(1)$ and $Y\text{min}(2) = Y\text{min}(1) + 2r$; (16c)

Alternatives 1 and 3 change the slopes of the segments of exponent function y(j). Alternative 2 shifts the exponent function y(j) in the positive direction. The user can determine which of the alternatives is used as a rule for changing the parameters of the exponent function. Other parameters of the attenuation profile 214 and exponent function can be adjusted, such as slopes, y-intercept values and segment lengths.

In an alternative embodiment for the compressor 500, the attenuation profile 214 can be defined in relation to the boundaries 140b and 140d of the object 110 being scanned in FIG. 1a. An edge detector can determine the edge samples corresponding to the transitions 150b and 150d (FIG. 1b) in each line of the array of projection data 160. For lossy compression, the attenuation profile 214 is applied to samples corresponding to attenuated x-rays within the boundaries corresponding to the transitions 150b and 150d. For lossless compression, the attenuator 210 is bypassed or set to unity between the transitions 150b and 150d. The samples corresponding to empty regions 150a and 150e are not encoded. The coordinates of boundaries are encoded instead.

Figure 9:
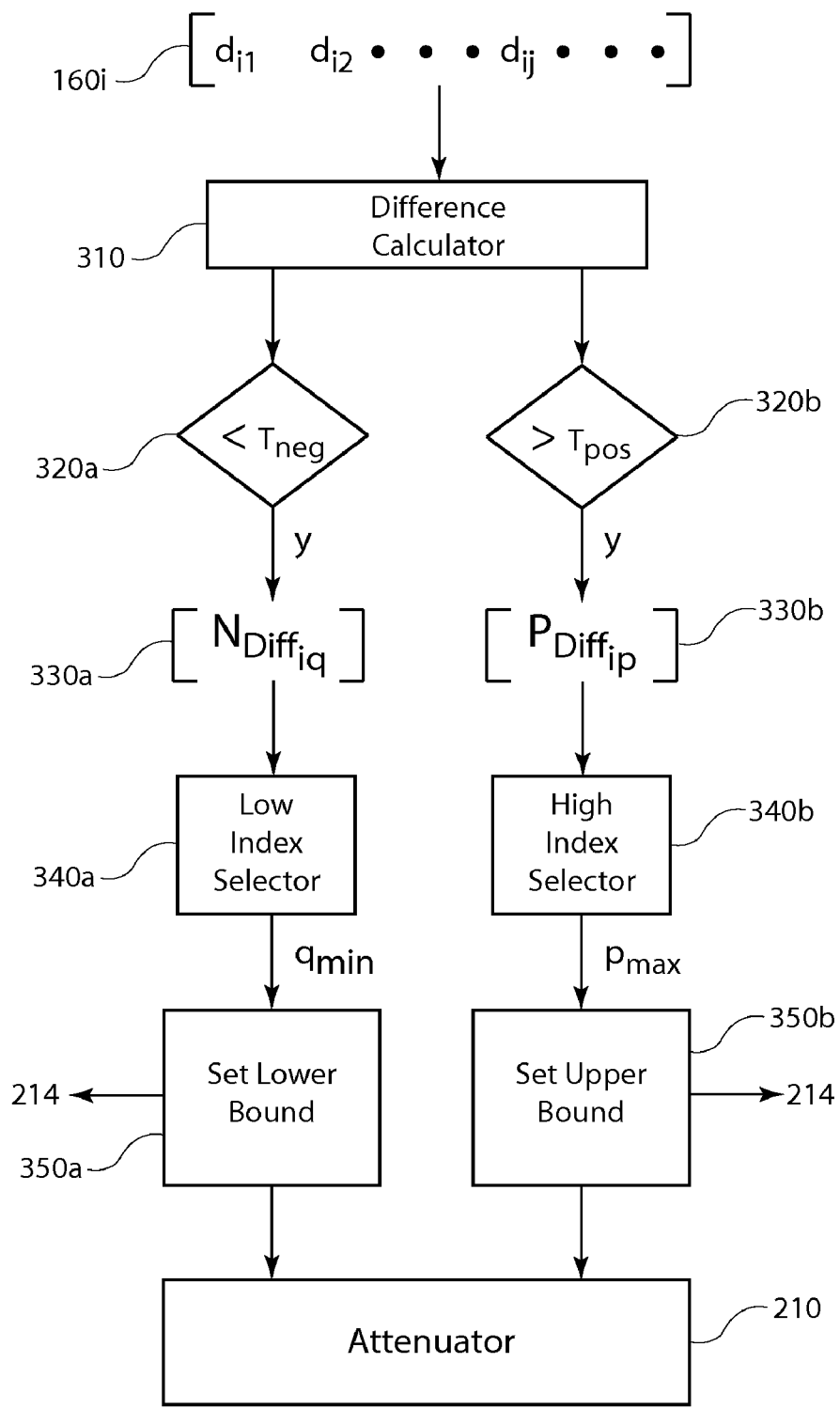
FIG. 9 is a block diagram for the derivative edge detector.

The preferred edge detector determines the edge samples based the sample differences, or derivatives, within the line and is referred to herein as the derivative edge detector. FIG. 9 is a block diagram for the derivative edge detector applied to a line of samples 160i of the array 160. The derivative edge detector block diagram depicted in FIG. 9 applies to projection data where the values of the samples corresponding to empty space 150a and 150e are greater than the values of the samples corresponding to the object 150c, such the signal 150 in FIG. 1b. It is assumed that the indices increase from left to right so that the left edge has a lower valued index and the right edge has a higher valued index. For this situation, a derivative that is negative and sufficiently large can indicate the left edge corresponding to transition 150b and a derivative that is positive and sufficiently large can indicate the right edge corresponding to transition 150d. The difference calculator 310 calculates first order differences of the samples $d_{ij}$ in the $i^{th}$ line. The comparator 320a compares the negative differences to a negative threshold $T_{neg}$ and the comparator 320b compares the positive differences to a positive threshold $T_{pos}$. The set 330a includes candidate samples $\text{NDiff}_{iq}$ having negative differences less than the negative threshold. The set 330b includes candidate samples $\text{PDiff}_{ip}$ having positive differences greater than the positive threshold. The low index selector 340a determines the lowest index $q_{min}$ corresponding to the candidate samples $\text{NDiff}_{iq}$ of set 330a to indicate the left edge. The high index selector 340b determines the highest index $p_{max}$ corresponding to the candidate samples $\text{PDiff}_{ip}$ of set 330b to indicate the right edge. The set lower bound block 350a and set upper bound block 350b determine the lower and upper boundaries, respectively, for the attenuation profile 214. The lower and upper boundaries for the attenuation profile 214 may include margins appended to the lowest index $q_{min}$ and highest index $p_{max}$. The lower and upper boundaries are provided as parameters to the attenuation profile 214. The encoder 212 also encodes the lower and upper boundaries to include with the compressed samples.

For the situation where values of the samples corresponding to empty space are less than the values of the samples corresponding to the projection data of an object being imaged, relationship of the positive and negative differences to the right and left edges is reversed. The positive difference samples greater than the positive threshold correspond to the left edge and the negative difference samples less than the negative threshold correspond to the right edge. For the operations shown in FIG. 9, the comparator 320a and set 330a for the negative differences would provide input to the high index selector 340b and the comparator 320b and set 330b would provide input to the low index selector 340a. Again, it is assumed that the indices increase from left to right.

The negative threshold $T_{neg}$ and positive threshold $T_{pos}$ can be determined iteratively as follows:

1) Set initial thresholds $T_{neg}$ and $T_{pos}$ to have maximum magnitudes;
2) Apply comparators 320a and 320b to compare negative differences to $T_{neg}$ and positive differences to $T_{pos}$, respectively;
3) If the set of candidate samples 330a or 330b is empty, reduce the magnitude of $T_{neg}$ or $T_{pos}$, respectively, and reapply step 2);
4) If the set of candidate samples 330a or 330b is not empty, continue with the low index selector 340a or the high index selector 340b, respectively.

The derivative edge detector can be used for other applications where the boundary information in the projection data is needed. In this case, the set lower bound block 350a and set upper bound block 350b would supply the boundary information to the other application. Alternative compression algorithms can also be applied to projection samples between the boundaries. For example, differential encoding the samples between the boundaries within the line of samples can be efficiently implemented because the first order differences are already calculated for the edge detection. Block floating point encoding, Huffman encoding or other bit packing can be applied to the difference samples between the boundaries. The boundary coordinates can be encoded and included with the compressed data.

The encoder 212 packs the compressed samples corresponding to a set of projection data samples acquired during a single view into a packet. Alternatively, the user can configure the encoder to generate compressed packets that correspond to other portions of the projection data, such as a subset of projection data for a single view or a superset of projection data that includes multiple views. The compressed packet is a data structure containing the packed bits of the compressed samples for corresponding projection data and an optional header containing one or more control parameters for the decompressor 576. When the compression ratio is fixed to a single value or range of values, the compressed packets will have the same size or a corresponding range of sizes. For lossless compression and some forms of lossy compression, the compression ratio is not fixed and the compressed packets will have different sizes.

The compressed packets resulting from a single scan can be stored in one or more files in storage device 502. For this description, it is assumed that all the compressed packets produced for one scan are stored in a single file. The storage device 502 can store the compressed data file for the scan until a command is received to access the compressed data. The storage device 502 can respond to a command to provide the compressed data on demand for image reconstruction processing. The compressed data can be retrieved and transferred across the slip ring interface 530 at a rate that supports the image reconstruction processing. For the example describe above, the data transfer rate for supporting image reconstruction processing is 30 MBps. Alternatively, the storage device 502 can respond to a command to provide the compressed data to a stationary storage device at a data transfer rate that accommodates the write speed of the stationary storage device. The user can determine the period of time that the compressed data for the scan is stored in the storage device 502 and the destination of the retrieved compressed data.

For projection data access that is transparent to the image reconstruction processor 572, the data access controller 574 accesses the appropriate compressed samples from the storage device 502 according to the parameters, or indices, of the scan geometry, such as the array of samples measured for the $j^{th}$ view. For a fixed packet size, the byte offset of a particular compressed packet is calculated by multiplying the fixed packet size by the packet index. For varying packet sizes, a table of packet sizes can be used for calculating the byte offset of a particular packet or group of packets. To support transparent data retrieval, the compressor 500 compiles data access information that relates the scan geometry parameters to the byte offsets of corresponding compressed packets. The data access information is subsequently used to determine the address of an individual compressed packet or a group of compressed packets in the storage device 502. The bit rate monitor 222 of FIG. 6 receives information on the number of bits per packet from the encoder 212, including compressed samples and header bits, if any. The compression controller 220 can create an array relating view indices to packet sizes using the packet information provided by the bit rate monitor 222.

Figure 10:
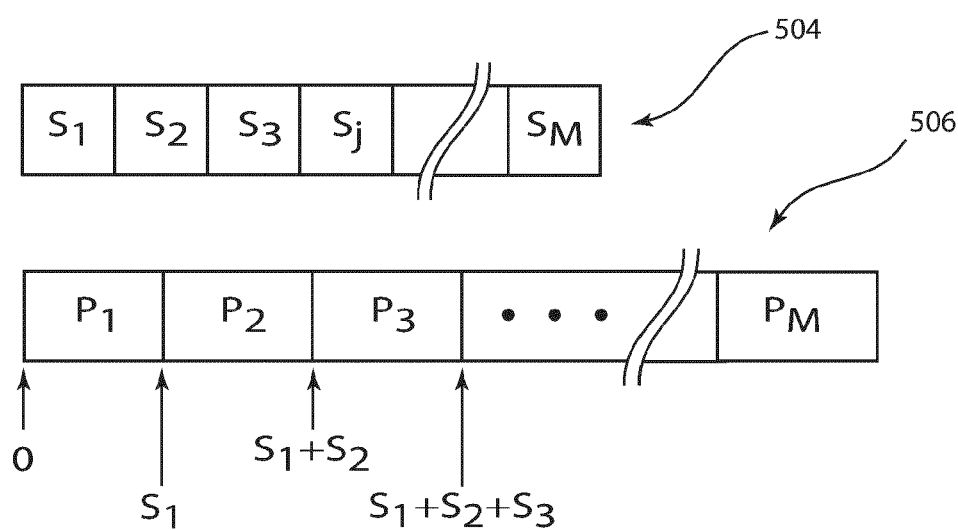
FIG. 10 gives an example of data access information for a single scan for which the compressed packet sizes vary.

FIG. 10 gives an example of data access information for a single scan for which the compressed packet sizes vary. Table 1 shows the relationships among view indices, packet sizes and byte offsets for compressed packets resulting from an exemplary scan that included M views. For this exemplary scan, the DAS 130 produces a projection data array 160 having 64 rows of samples, 900 samples per row and 2 bytes per sample, so that each view generates a total of 115 kB of projection data. Assuming for this example that lossless compression achieves an average compression ratio of 1.7:1, the compressed packets have an average size of 67 kB. All the compressed packets for the scan are stored in one file in storage device 502. The byte offset index for the current packet is determined by accumulating the packet sizes of the previous packets. The packet size array 504 represents the packet sizes $S_j$ in kilobytes for the sequence of views in the scan. Assuming that each packet size can be represented by a four-byte integer, the packet size array 504 adds 4 bytes storage overhead per 1000 bytes of compressed data. This is a negligible amount of overhead compared to the compressed packet sizes. The compression controller 220 can generate the packet size array 504 using packet size information received from the bit rate monitor 222. The array 506 represents a sequence of compressed packets $P_j$ that are generated by the encoder 212 and stored in a file in the storage device 502. The byte offset for the second compressed packet $P_2$ is $S_1$ kilobytes. The byte offsets for subsequent compressed packets are calculated by accumulating the previous packet sizes.

The data access information can be formulated to support different procedures for data access desired by the user. In one alternative, the data access procedure is analogous to retrieving data from a file stored in a SATA storage device. The data access controller 574 requests the compressed packets according to location parameters, such as byte offsets. For variable packet sizes, the data access controller 574 uses the data access information relating view indices, packet sizes and byte indices (such as those given in Table 1 of FIG. 10) to determine the parameters for the data retrieval requests. The byte index corresponds to an offset, in bytes, from the first byte of compressed data in the file. The data access information can be stored in the memory of computer 570 or in local storage 562. The data access information is generated while data compression and storage are in progress during the scan. The data access information can include a sequence of packet sizes represented in an array, such as packet size array 504. During and/or after the scan, the rotatable controller 542 transmits the data access information over a control channel to the stationary controller 552 and ultimately to the data access controller 574. The data access controller 574 uses the data access information to determine the byte offsets for the packets of compressed data corresponding to the projection data needed for image reconstruction. The data access controller 574 provides SATA-compatible commands to retrieve the corresponding compressed packets from the storage device 502.

In another alternative, the data access is analogous to retrieving data from a virtual "view buffer." The data access controller 574 requests a packet according to an index parameter, such as the view index for the corresponding projection data. The data access information is stored on the rotatable part 510, as a file in the storage device 502 or in a memory of the rotatable controller 542. Upon receiving the request to retrieve projection data for a particular view index, the rotatable controller 542 uses the data access information to determine the byte offset of the corresponding packet or sequence of packets in the storage device 502 and provides SATA-compatible command to retrieve the packet or sequence of packets from the storage device 502. The data access controller 574 can indicate multiple view indices in one request so that the rotatable controller 542 can retrieve the corresponding compressed packets.

Figure 11:
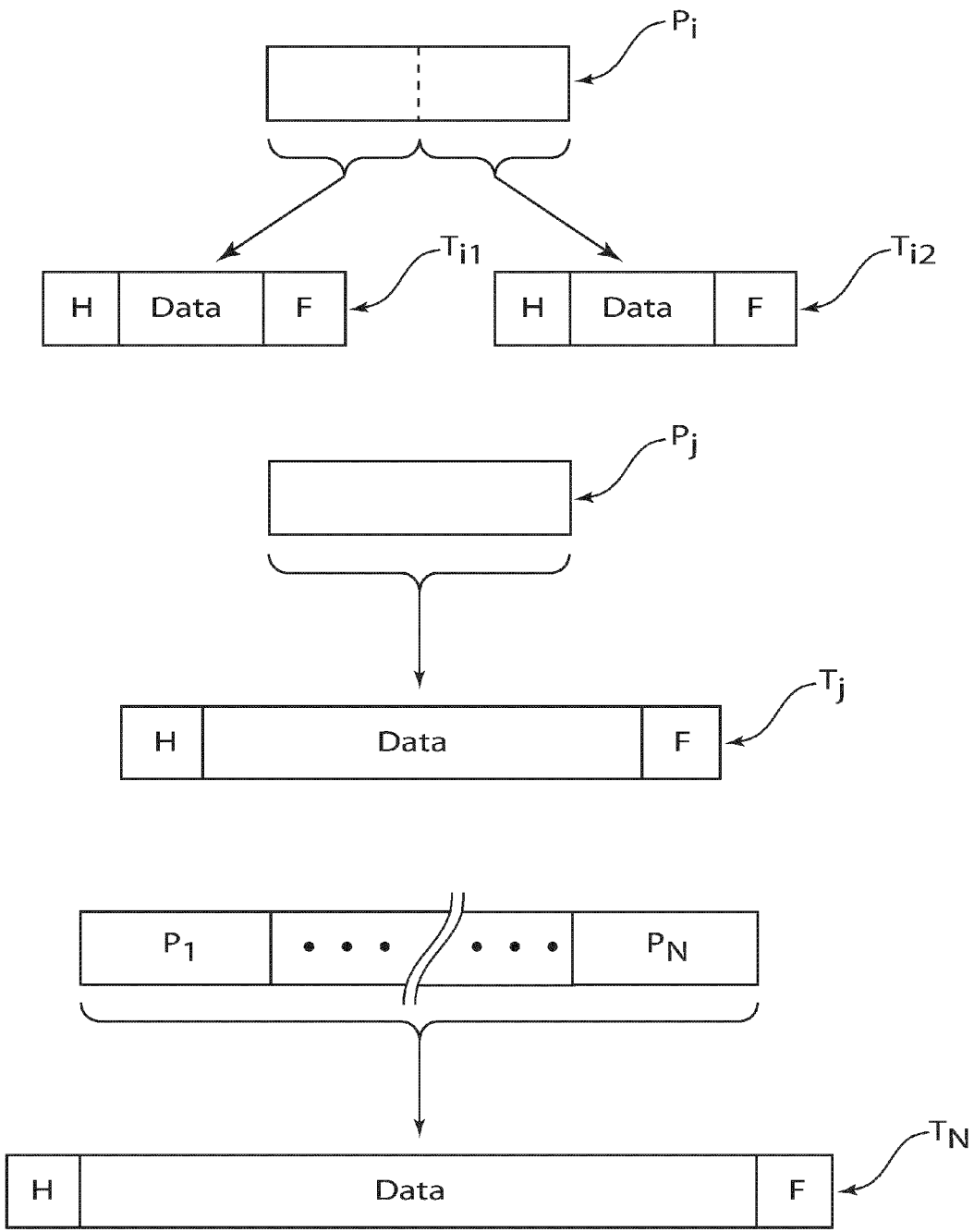
FIG. 11 shows alternative mapping schemes for the compressed packets to form the data transmission packets.

The transmitter 540 transmits the retrieved compressed packets across the slip ring interface 530 to the receiver 550. The implementations of the transmitter 540 may include the formation of data transmission packets. One implementation of data transmission packets is described by Popescu et al. in the U.S. Patent Application Publication entitled "Method and Device for Data Transmission between Two Components Moving Relative to One Another," publication number US 2008/0205446, Aug. 28, 2008. The rotatable controller 542 or other processer associated with the transmitter 540 inserts the compressed packets, including compressed packet headers, into the data portion of the data transmission packet. The mapping of the compressed packets to the data transmission packets depends on the format parameters of the data transmission packet. FIG. 11 shows alternative mapping schemes for the compressed packets to form the data transmission packets. The data transmission packets each include a header portion, indicated by "H", and a footer portion, indicated by "F". An example of the header portion includes fields for synchronization (sync) data and transmission packet identification. An example of the footer portion includes fields for forward error correction (FEC) and cyclic redundancy check (CRC). In one alternative mapping, the compressed packet $P_i$ is divided and inserted into the data portions of multiple data transmission packets, $T_{i1}$ and $T_{i2}$. In another alternative mapping, the entire compressed packet $P_j$ is inserted into the data portion of a single data transmission packet $T_j$. In another alternative, multiple compressed packets $P_1$ to $P_N$ are combined and inserted into a single data transmission packet $T_N$. The transmitter 540 can apply 8 B10 B or similar encoding to the data transmission packets prior to transfer over the slip ring interface 530. The receiver 550 can apply 8 B10 B or similar decoding of the data transmission packets. The stationary controller 552 or other processor associated with the receiver 550 can extract the compressed packets from the data portion of the received data transmission packets and reassemble the sequence of compressed packets.

The receiver 550 transfers the compressed packets over a SATA-compatible connection to the computer 570, where they are routed to the decompressor 576. The decompressor 576 processes the compressed packets and provides the decompressed samples to the image reconstruction processor 572. The image reconstruction processor 572 uses the decompressed samples to compute an image using well-known CT image reconstruction algorithms. The reconstructed image can be presented on display 580. The compressed samples may also be stored in a stationary storage device 562 or data storage media prior to decompression and image reconstruction.

Figure 12:
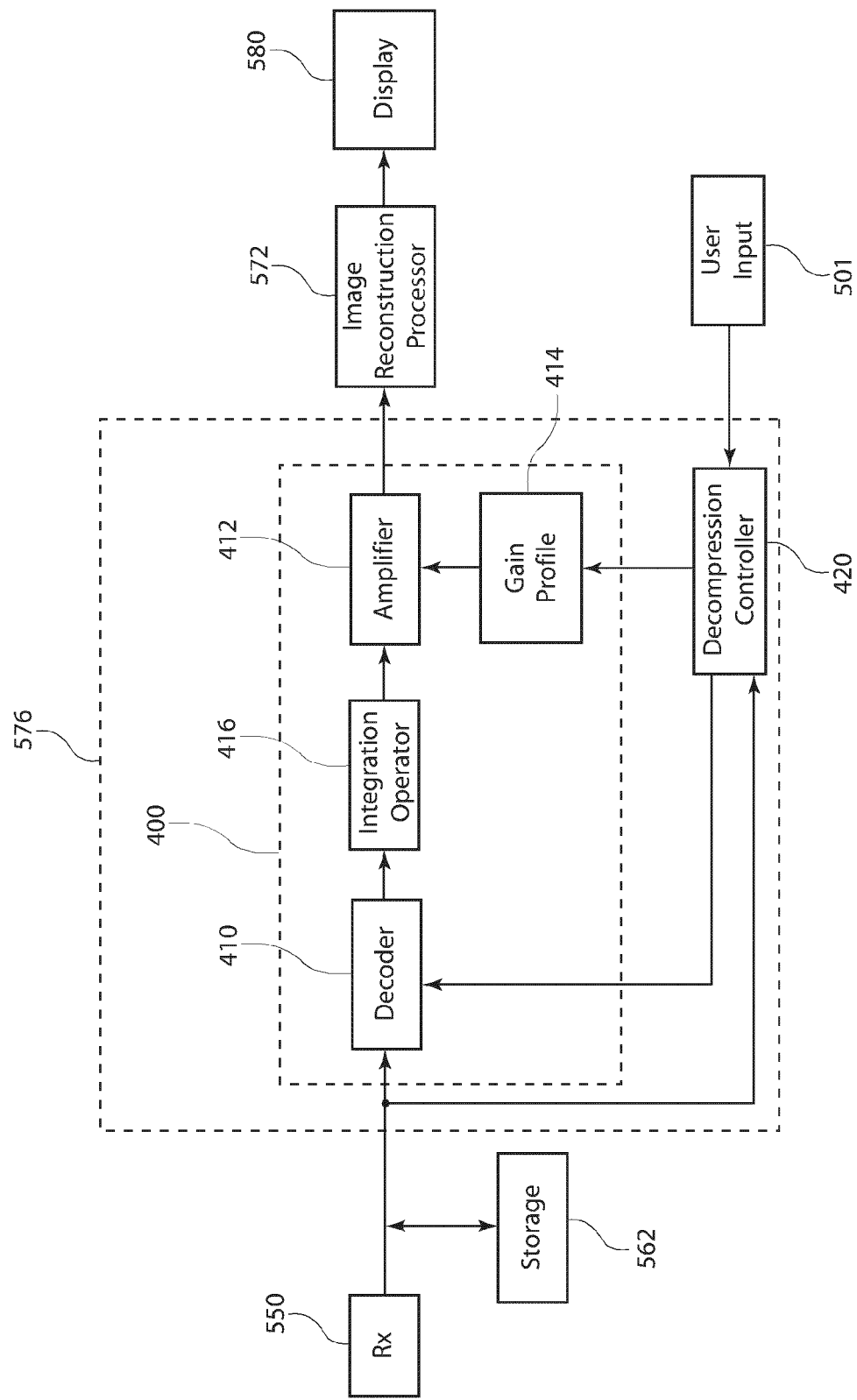
FIG. 12 is a block diagram of a preferred embodiment of the decompressor.

FIG. 12 is a block diagram of a preferred embodiment for the decompressor 576. The preferred embodiment for the decompressor 576 includes the decompression processor 400 and decompression controller 420. The decompression processor 400 decompresses the compressed samples prior to the image reconstruction calculations. The decompression controller 420 provides compression control parameters to the decompression processor 400. When compression control parameters are included in the compressed data, they are recovered by the decompression controller 420. The decompression controller 420 also receives user input 501.

The decompression processor 400 depicted in FIG. 12 corresponds to the compression processor 200 of FIG. 6 that applies differential encoding. The decompression processor 400 applies differential decoding to the input compressed samples. The decoder 410 unpacks the compressed samples by applying block floating point decoding, Huffman decoding or other unpacking appropriate for the encoding applied by the encoder 212. Since the compression processor 200 includes the difference operator 216, as described with respect to FIG. 6, the unpacked samples correspond to decoded difference samples. The decompression processor 400 applies the integration operator 416 to form reconstructed attenuated samples. The integration operator 416 applies first or higher order integration to invert the corresponding difference operations of the difference operator 216, in accordance with one of the following:
1) Integrating the decoded difference samples in the same line, or row, to reconstruct consecutive attenuated samples, or integrating column by column;
2) Integrating the decoded difference samples in corresponding positions in multiple lines, or integrating row by row, to reconstruct attenuated samples corresponding to consecutive lines of the same set of projection data;
3) Integrating decoded difference samples in corresponding positions in multiple arrays, or integrating array by array, to reconstruct arrays of attenuated samples corresponding to consecutive sets of projection data.

Alternatively, for the compression processor 200 of FIG. 4 that does not include differential encoding, the decompression processor 400 would bypass or not include the integration operator 416. The decoder 410 unpacks the compressed samples by applying block floating point decoding, Huffman decoding or other unpacking appropriate for the encoding applied by the encoder 212. In this case, the decoded samples correspond to the reconstructed attenuated samples and are input to the amplifier 412.

The amplifier 412 applies the gain profile 414 to the reconstructed attenuated samples to form the decompressed samples. For the attenuation profile function g(j) of equation (1) the corresponding gain profile function f(j) is, $$f(j)=2^{y(j)} y(j) \geq 0 \qquad (17).$$

The amplifier 412 does not restore the original sample values of array 160 because the truncation, quantization or rounding that occurs from attenuation is irreversible. Since the gain profile function f(j) does not provide the exact inverse of the attenuation profile function g(j), the resulting compression/decompression is lossy. However, the decompressed samples have the same number of bits per sample and the same dynamic range as the original samples.

The amplifier 412 applies a gain profile 414, such as that of equation (17) by multiplying the reconstructed attenuated samples by the corresponding gain values, $f(j) \geq 1$. The gain values for the gain profile 414 can be stored in a lookup table in memory and provided to the amplifier 412. Alternatively, the amplifier 412 can calculate the gain values from parameters representing the gain profile 414. A simple embodiment of the amplifier 412 includes left shifting the samples by a number of bits corresponding to the gain values and setting the additional least significant bits to zero or dithered values. A left shift corresponds to a multiplication by two. When the gain profile 414 represented by f(j) is an exponential function of base 2, as in equation (17), the exponent function y(j) can be truncated or rounded to determine a whole number of left shifts. The left shift values corresponding to the gain profile 414 can be stored in a lookup table or calculated by the amplifier 412 from parameters of the gain profile 414. Alternatively, when the value y(j) in equation (7) is not an integer, the fractional part of y(j) can be applied using a multiplier. The image reconstruction processor 572 reconstructs an image from the decompressed samples.

When the compression processing includes defining the boundaries of the attenuation profile 214 with respect to edge samples of the projection data, such as described with respect to FIG. 9, the decompression processor 400 also decodes the boundary information included with the compressed samples. The amplifier 412 applies the gain profile 414 within the appropriate boundaries of the reconstructed attenuated samples.

The compression processor 200 applies simple operations that can compress samples output from the ADCs of the DAS 130 in real time. The attenuator 210 can include a multiplier, divider and/or right shift operator. A lookup table stored in memory can supply the attenuation values for the attenuator 210. The difference operator 216 includes one or more subtractors. Multiple subtractors operating in parallel can calculate line-by-line or array-by-array differences. An encoder 212 applying block floating point encoding uses comparators, subtractors and lookup tables. An encoder 212 applying Huffman encoding uses a lookup table to assign a code to the attenuated sample value or difference value. The bit rate monitor 222 and compression controller 220 use addition, subtraction and multiplication operations. The decompression processor 400 applies simple operations to decompress the compressed samples in real time. The decoder 410 includes lookup tables and adders for block floating point decoding. The integration operator 416 includes one or more adders for integrating the decoded samples. The amplifier 412 can include a multiplier or a left shift operator. The values of the gain profile 414 can be stored in a lookup table in memory.

Figure 13:
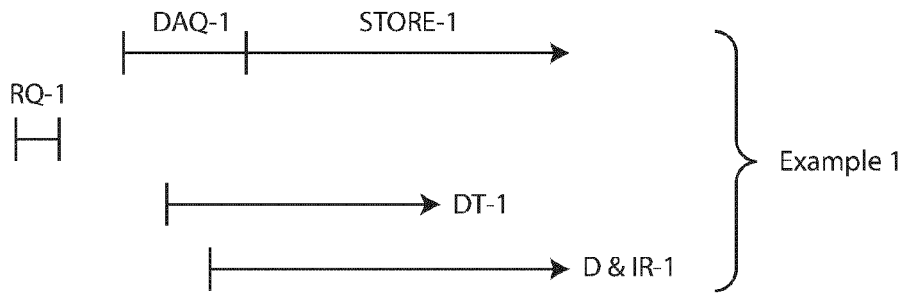
FIG. 13 gives several examples of different procedures for data retrieval supported by the preferred embodiments.
Figure 13:
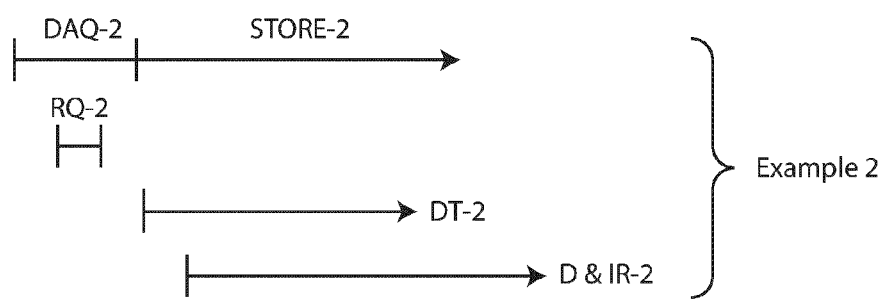
Figure 13:
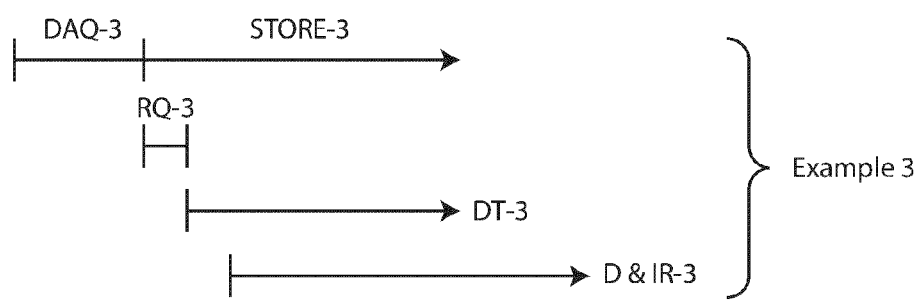
Figure 13:
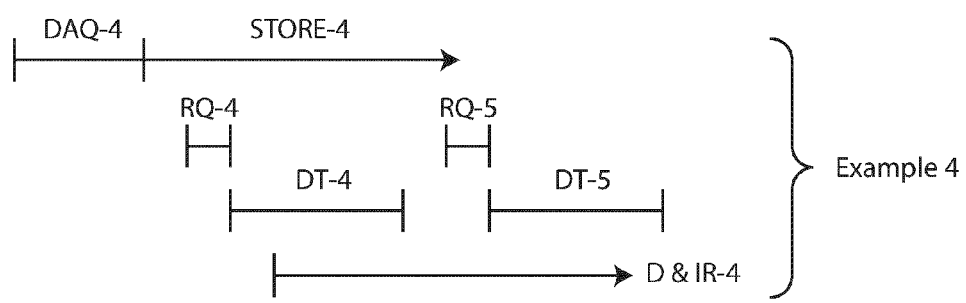

The present invention provides for flexible, dynamic data storage and retrieval from the storage device 502. The user can define the data storage and retrieval procedures that are appropriate for the particular scan protocol. FIG. 13 gives several examples of procedures for data storage and retrieval supported by the preferred embodiments. The examples in FIG. 13 represent time periods for data acquisition (DAQ) by the DAS 130, storage (STORE) of the compressed packets in the rotatable storage device 502, request (RQ) for retrieval of compressed samples from the rotatable storage device 502, data retrieval and transfer (DT) of the compressed packets from the storage device 502 to the computer 570, and decompression followed by image reconstruction (D&IR) of the received compressed samples performed, respectively, by the decompressor 576 and the image reconstruction processor 572. The data access controller 574, rotatable controller 542 or stationary controller 552 can provide requests RQ for retrieval of the stored compressed samples. Note that the time periods represented are not to scale relative to each other, but indicate a sequence of events. The data acquisition period DAQ can represent the time period for an entire scan or a part of a scan. The storage period (STORE) can actually begin during the DAQ period. However, the STORE period continues after the DAQ period ends. The data retrieval and transfer period DT can include a single interval during which all the requested data are transferred or multiple discrete intervals, during which portions of the compressed projection data are transferred. The compressed samples can be stored for a controllable period of time. Alternatives include storing the compressed samples until the image reconstruction is complete or for an extended time after the image reconstruction is complete. Another alternative is storing the compressed samples until they are downloaded to a stationary storage device. The data access controller 574, rotatable controller 542 or stationary controller 552 can provide commands to the storage device that control the time period for storage of the compressed samples. The user can configure the operations of the controllers 574, 542 and 552 to provide the commands for data storage and retrieval that support the scan protocol.

In Example 1 of FIG. 13, the request RQ-1 is provided prior to the data acquisition period DAQ-1, as a command or a series of commands to rotatable controller 542. The data access controller 574 provides the request RQ-1 for the index parameters corresponding to the desired part of the projection data prior to the DAQ-1. The data retrieval and transfer DT-1 can commence anytime after the corresponding compressed samples are available. Decompression and image reconstruction D&IR-1 can commence after the compressed samples are received at the computer 570. In Example 2, the data access controller 574 provides the request RQ-2 during the data acquisition period DAQ-2. Alternatively, the rotatable controller 542 or stationary controller 552 may generate request RQ-2. The request RQ-2 can include index parameters corresponding to a specific part of the projection data or the corresponding location parameters, such as byte offsets, if available. The period for data retrieval and transfer DT-2 can commence anytime after the corresponding compressed samples are available. Decompression and image reconstruction D&IR-2 can commence after the compressed samples are received at the computer 570. In Example 3, the request RQ-3 is provided after the data acquisition period DAQ-3. The data access controller 574, rotatable controller 542, or stationary controller 552 can generate the request RQ-3. The request RQ-3 can include index parameters or location parameters corresponding to a specific part of the projection data. If the request RQ-3 is generated by data access controller 574 or stationary controller 552, the data retrieval and transfer DT-3 commences after the request RQ-3 is received and processed by the rotatable controller 542. Decompression and image reconstruction D&IR-3 can commence after the compressed samples are received at the computer 570. In Example 4, multiple requests provided after the data acquisition period DAQ-4 indicate different parts of the projection data needed during the decompression and image reconstruction period D&IR-4. The data access controller 574 generates each request RQ-4, RQ-5, etc., in response to requests from the image reconstruction processor 572 to retrieve the compressed packets corresponding to the requested part. The requests RQ-4 and RQ-5 can be based on index parameters or location parameters. The compressed packets corresponding to the respective requests are retrieved from the storage device 502 and transferred to the computer 570 during the respective periods DT-4 and DT-5. After the compressed packets are received, the decompressor 576 decompresses them and provides the corresponding decompressed samples to the image reconstruction processor 572 during the D&IR-4 period.

The storage period can be determined by storage parameters provided to the storage device 502. The user can select a storage protocol that is appropriate for the scan protocol or an overall data management protocol. For example, the user may select a storage protocol that provides storage of the compressed projection data in storage device 502 for the entire scan until a period of time after the completion of image reconstruction. The data access controller 574 can determine the storage parameter representing the period of time and provide it to the rotatable controller 542 via a control channel of the slip ring interface 530. During the storage period, the storage device 502 responds to commands to retrieve the compressed projection data for image reconstruction as described with respect to the examples in FIG. 13. The image reconstruction processor 572 can send a parameter indicating completion of the image reconstruction to the data access controller 574 which relays it to the rotatable controller 542 that starts a timer. When the storage period expires, the rotatable controller 542 provides a command to the storage device 502 to delete the file for the scan or to make the storage locations available for writing compressed projection data from a new scan. Alternatively, the user can select a storage protocol that specifies downloading the compressed projection data to the stationary storage device 564 when the storage period expires. In this case when the storage period expires, the rotatable controller 542 provides commands to the storage device 502 and the transmitter 540 to transfer the compressed projection data to the storage device 564.

The control of storage time can also respond to other combinations of conditions. For example, the rotatable controller 542 can track the fullness condition of the storage device 502. A predetermined level of fullness can trigger a warning to the user or an automatic download of one or more files from the storage device 502 to the stationary storage device 564. File manipulations are also supported. For example, after viewing a series of images of slices in a volumetric scan, the user may decide that only certain slices are relevant. The user can select an option to continue storing the corresponding compressed projection data and remove the irrelevant data. The data access controller 574 can respond to the selection by determining the location parameters or the index parameters corresponding to the selected slices and relaying those parameters to the rotatable controller 542. The rotatable controller 542 can create a new file or modify the existing file to save the desired portion compressed projection data in the storage device 502. Alternatively, the user can select options to download the file containing the relevant portion to the stationary storage device 564 and to delete the file on the storage device 502. The industry standard protocol for the storage device 502 allows customary options for file manipulation, including deleting files, moving files to the storage 564, organizing files into directories, etc. The file manipulations can be incorporated into programs in computer 570 to execute a file management protocol. The user can also interactively provide commands to the computer 570 via user input 501 for file manipulation.

Figure 14:
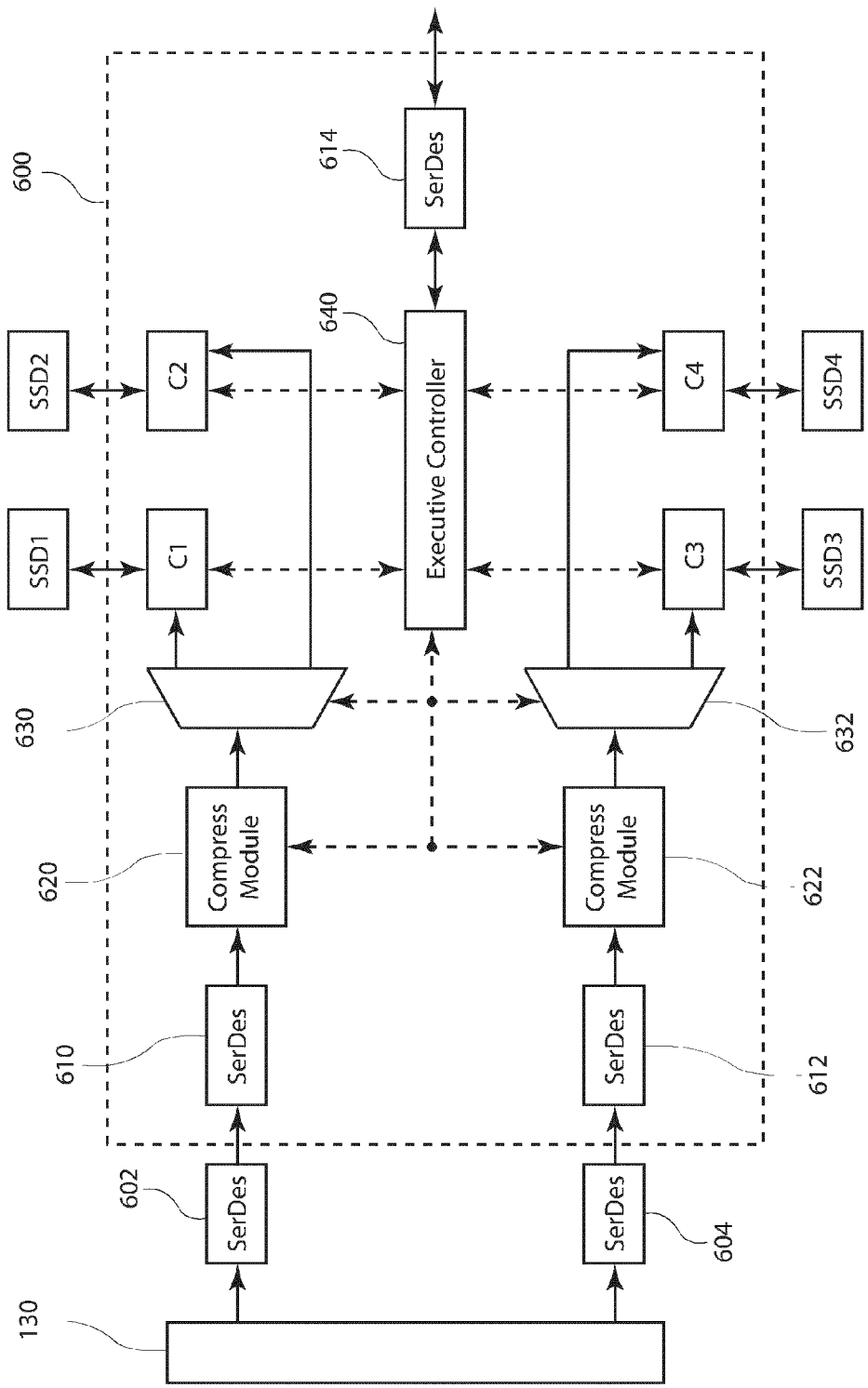
FIG. 14 is a block diagram of an implementation of compression and storage on the rotatable part of the CT system, in accordance with a preferred embodiment.

FIG. 14 is a block diagram of an implementation of compression and storage on the rotatable part 510 of the CT system. The compression and control operations are implemented in a field programmable gate array (FPGA) 600 connected to the DAS 130. In this example, two streams of projection data are compressed and stored to four SATA SSD modules SSD1, SSD2, SSD3 and SSD4. The DAS 130 provides the projection data samples to FPGA 600 in two streams of samples, each with half of the samples from the array 160 (FIG. 4). The SerDes transceivers 602 and 604 apply 8B10B encoding and serialize projection data samples to form two data streams input to the FPGA 600. The DAS 130 can distribute the projection data sent across the SerDes transceivers 602 and 604 in several ways. For example, when each view produces projection data samples corresponding to 1000 sensors per row and 100 rows per view, the DAS 130 could distribute the projection data according to one of the following alternatives:

1) For each view, SerDes 602 transmits rows 1 to 50 and SerDes 604 transmits rows 51 to 100;
2) For all 100 rows in a view, SerDes 602 transmits sensor values 1 to 500 and SerDes 604 transmits sensor values 501 to 1000;
3) For each view, SerDes 602 transmits odd-numbered rows and SerDes 604 transmits even-numbered rows; or
4) SerDes 602 transmits the projection data for odd-numbered views while SerDes 604 transmits even-numbered views.

The FPGA input SerDes transceivers 610 and 612 deserialize and apply 8B10B decoding to the data streams to regenerate the respective sequences of projection data samples. The compression modules 620 and 622 operate in parallel on separate input sample streams to produce the compressed samples for each input data stream at the sample rate of the DAS 130. For example, suppose that the DAS 130 produces projection data samples at 400 Msps to both SerDes transceivers 602 and 604 and that each compression module 620 and 622 has a processing rate of 200 Msps. The compression modules 620 and 622 operating in parallel process the projection data samples at 400 Msps, or in real time. The compressed sample streams output from the compression modules 620 and 622 are each divided to match the write access bandwidth of the SSDs. For example, suppose the SSDs each have a write access bandwidth of 100 MBps and the original projection data samples have two bytes per sample. In this case, the compression modules 620 and 622 each provide a compression ratio of 2:1 to produce compressed sample streams at a rate of 200 MBps. The bandwidth of the compressed samples must be divided in half to accommodate the limited write access bandwidth of the SSD. The demultiplexers 630 and 632 divide the respective streams of compressed samples for storage in the storage modules SSD1, SSD2, SSD3 and SSD4 in accordance with control information from the executive controller 640. Preferably, each demultiplexer 630 and 632 divides the respective compressed samples on packet boundaries so that an entire compressed packet is stored in a single SSD. For example, the demultiplexer 630 can direct alternate packets to SSD1 and SSD2 in a ping-pong arrangement. The SATA controllers C1, C2, C3 and C4 manage the storage and retrieval of data in accordance with the SATA protocol.

The executive controller 640 also provides data access control and coordination of the SATA controllers C1, C2, C3 and C4. Since the compressed packets corresponding to different views can be stored on different SSDs, the executive controller 640 can also maintain information relating the logical addresses for the compressed packets, such as the byte offsets described with respect to FIG. 10, to the corresponding physical addresses in the SSDs. For data retrieval, the executive controller 640 receives commands to retrieve projection data from the data access controller 574, rotatable controller 542 or stationary controller 552. The executive controller 640 directs the retrieval of corresponding compressed packets from the appropriate SSD and outputs the retrieved compressed packets over the SerDes transceiver 614. A read access bandwidth of tens of MBps for the SSDs supports image reconstruction processing rates of current technology. The output SerDes transceiver 614 provides 8B10B encoding and serializing of the retrieved compressed samples for transmission across the slip ring interface 530. The SerDes transceivers and SATA controllers employ industry-standard protocols, so intellectual property (IP) cores for implementations in FPGA 600 are commercially available.

Figure 15:
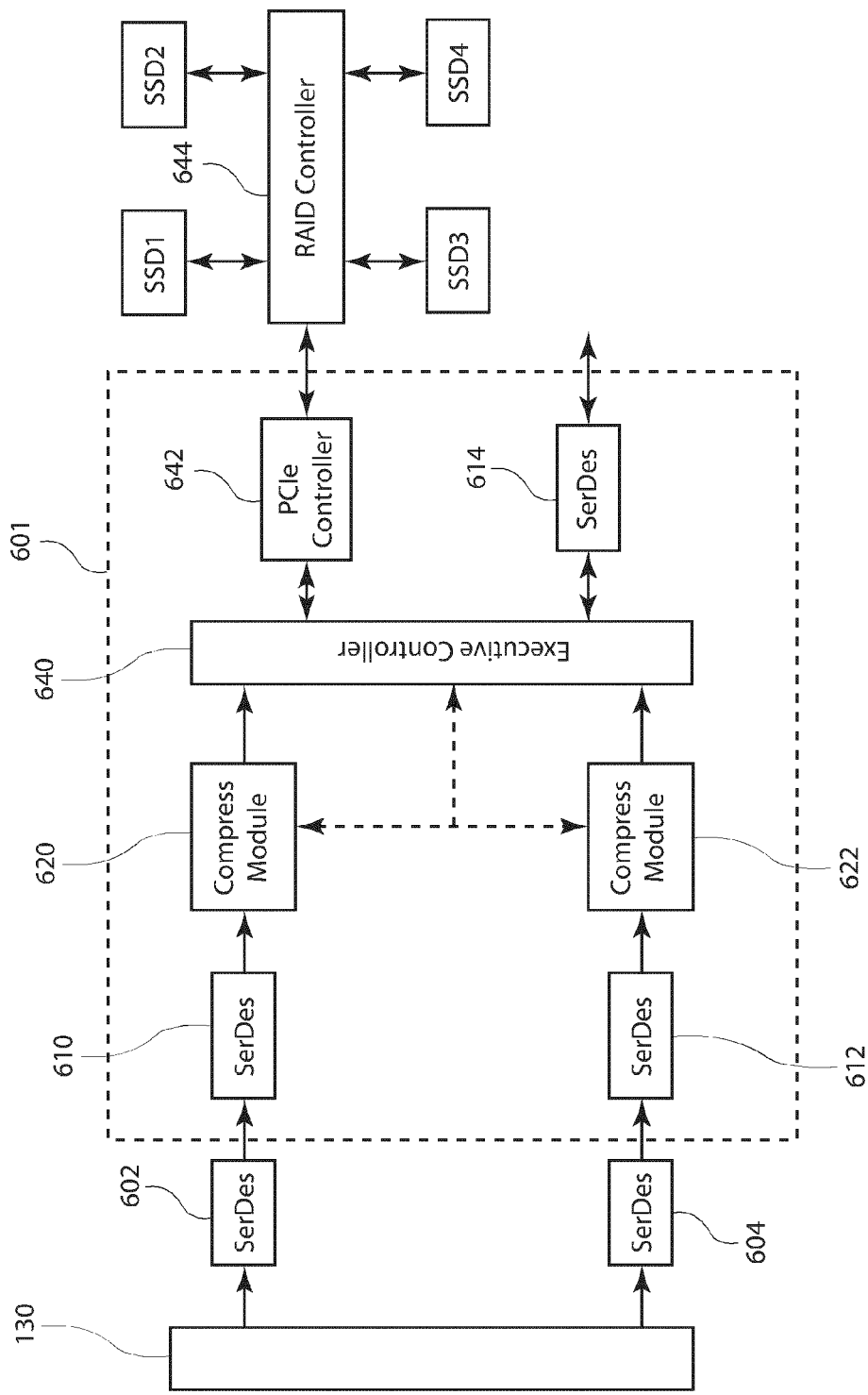
FIG. 15 is a block diagram of an alternative implementation of compression and storage on the rotatable part of the CT system, in accordance with a preferred embodiment.

FIG. 15 is a block diagram of an alternative implementation of compression and storage on the rotatable part 510 of the CT system. In this implementation, the control and interfaces of the SSDs are managed by a RAID controller 644 external to the FPGA 601. Commercially available RAID controller cards can interface with multiple SSDs. Commercial RAID controller products are compatible with industry standards for peripheral component interface (PCI), such as PCI Express (PCIe) or PCI Extended (PCI-X). The FPGA 601, RAID controller 644 and SSDs are mounted on the rotatable part 510. The FPGA 601 is connected to the DAS 130 for receiving and compressing the projection data samples as described with respect to FPGA 600 in FIG. 14. The FPGA 601 includes a PCIe controller 642 for the PCIe interface to the RAID controller 644. IP cores implementing the PCIe protocol for FPGAs are commercially available. The executive controller 640 provides control parameters for the compression operations of the compression modules 620 and 622. The executive controller 640 interfaces with the PCIe controller 642 and SerDes 614 to coordinate control of data access. For storage of the compressed packets, the executive controller 640 routes the compressed packets output from the compression modules 620 and 622 to the PCIe controller 642 for transfer from the FPGA 601 to the RAID controller 644. The RAID controller 644 directs the compressed packets to the SSDs for storage. For retrieval of the stored packets, the RAID controller 644 retrieves the packets from the SSDs and transfers them to the FPGA 601 via the PCIe controller 642. The executive controller 640 directs the retrieved packets to the output SerDes transceiver 614 where they are 8B10B encoded and serialized for transmission across the slip ring interface 530.

In alternative implementations, the compression and control functions of the FPGA 600 or the FPGA 601 can be implemented in an application specific integrated circuit (ASIC) or a programmable processor, such as a digital signal processor (DSP), microprocessor, microcontroller, multi-core CPU, or graphics processing unit (GPU).

Depending on the CT system architecture, the decompressor 576 can be incorporated into the computer 570 that is part of a control console for the CT system. The decompressor functions can be programmed for a CPU, GPU or DSP. Alternatively, the decompressor 576 can be implemented in an ASIC or FPGA. In the CT system architecture described with respect to FIG. 3, the decompressor 576 is applied to the compressed samples just prior to image reconstruction 572. Alternatively, the decompressed samples 576 can be stored in the stationary storage device 564 and later retrieved for image reconstruction. In another alternative, the decompressor 576 can be located on the stationary part 520 and connected to the receiver 550 to decompress the received compressed samples before they are transferred to the computer 570 or the stationary storage device 564. In another alternative, the decompressor 576 can be disposed between the storage device 502 and the transmitter 540 on the rotatable part 510. In this alternative, the compressed samples are decompressed after retrieval from the storage device 502 and before transfer across the slip ring interface 530 to the computer 570 or the stationary storage device 564. The user input 501 can be incorporated into an interface of the control console for the CT system using programming techniques well known in the art.

While embodiments of the present invention are described herein using examples related to medical applications of computed tomography, the present invention is not limited to medical applications. Embodiments of the present invention can also be adapted for use in industrial computed tomography. In industrial computed tomography systems, the apparatus that moves the object, x-ray source and detector array is designed for the types of objects being tested. During a scan of the object, the relative motion of the object, x-ray source and detector array results in several views that generate sets of projection data to which embodiments of the present invention can be applied.

While the preferred embodiments of the invention have been illustrated and described, it will be clear that the invention is not limited to these embodiments only. Numerous modifications, changes, variations, substitutions and equivalents will be apparent to those skilled in the art, without departing from the spirit and scope of the invention, as described in the claims.

We claim:

1. A method for data compression and storage in a rotatable part, the rotatable part mounted for rotation within a stationary part and having an interface between the stationary part and the rotatable part, wherein a plurality of sets of projection data are provided by a data acquisition source connected to the rotatable part, wherein each set of projection data corresponds to a view angle of rotation of the rotatable part and includes an array of samples acquired for a corresponding view during a data acquisition period, the method comprising:

compressing the samples of each set of projection data to form compressed samples, wherein the compressed samples for each set are arranged in at least one compressed packet, wherein each compressed packet contains the compressed samples of a corresponding portion of the projection data;

storing a plurality of the compressed packets for the plurality of sets of projection data in a storage device connected to and rotating with the rotatable part, wherein each of the compressed packets is stored at a corresponding location in the storage device that is accessible based on a packet location parameter during a controllable time period;

maintaining an access array containing a plurality of data access parameters corresponding to the plurality of compressed packets, wherein at least one index parameter is associated with the corresponding portion of the projection data for each of the plurality of compressed packets, further comprising:

calculating a size of each compressed packet to form a plurality of sizes; and generating the plurality of data access parameters based on the plurality of sizes, wherein the access array associates the data access parameter with the index parameter of the corresponding portion of the projection data;

retrieving using a data access parameter from the access array, at least one of the compressed packets from the corresponding location in the storage device in accordance with the packet location parameter in response to a data access command;

mapping the compressed packet retrieved from the storage device to at least one data transmission packet, wherein one or more data transmission packets contain the compressed samples of the compressed packet; and transmitting the data transmission packet from a transmitter on the rotatable part to a receiver on the stationary part over a communication channel of the interface.

2. The method of claim 1, wherein the step of compressing further comprises:

calculating a plurality of differences between a plurality of pairs of corresponding samples to form a plurality of difference samples for the set of projection data; and encoding the plurality of difference samples to form the compressed packet.

3. The method of claim 2, wherein the step of calculating a plurality of differences further comprises:

calculating differences corresponding to at least two alternative difference types for at least one set of projection data to form a set of difference samples for each alternative difference type;

determining a number of bits for representing each set of difference samples; and selecting the set of difference samples representable by a fewest number of bits to form a selected set of difference samples, wherein the step of encoding is applied to the selected set of difference samples to form the compressed packet.

4. The method of claim 3, wherein the alternative difference types include a sample-by-sample difference type, a line-by-line difference type and a projection-by-projection difference type, wherein the step of calculating differences corresponding to at least two alternative difference types applies at least two of the following steps to the array of samples:

calculating differences between consecutive samples from each line of the array to form a set of sample-by-sample difference samples;

calculating differences between samples from corresponding positions in consecutive lines of the array to form a set of line-by-line difference samples; and calculating differences between samples from corresponding positions in the array and a previous array of samples for a previous projection data set to form a set of projection-by-projection difference samples.

5. The method of claim 2, wherein the step of compressing further comprises attenuating the samples prior to the step of calculating a plurality of differences, the attenuating further comprising:

setting one or more parameters of an attenuation profile in memory, wherein the attenuation profile is a function of the sample coordinates and specifies a plurality of attenuation values, wherein the attenuation values are less than or equal to one; and attenuating the samples of the array in accordance with the attenuation profile to form attenuated samples having magnitudes less than or equal to original magnitudes of the samples, wherein the step of calculating a plurality of differences is applied to the attenuated samples.

6. The method of claim 1, further comprising:

determining the packet location parameter of a corresponding compressed packet using one or more of the data access parameters in the access array in accordance with the index parameter; and providing the packet location parameter in the data access command, wherein the step of retrieving is applied to retrieve the corresponding compressed packet from the storage device in accordance with the packet location parameter.

7. The method of claim 1, further comprising:

providing the index parameter in the data access command; and determining the packet location parameter of a corresponding compressed packet using one or more of the data access parameters in the access array in accordance with the index parameter, wherein the step of retrieving is applied to retrieve the corresponding compressed packet from the storage device in accordance with the packet location parameter.

8. The method of claim 1, wherein the step of retrieving responds to the data access command in accordance with an industry standard protocol for storage device access.

9. The method of claim 1, wherein the step of retrieving commences at a point in time after the data acquisition period.

10. The method of claim 1, further comprising:

receiving the data access command at a point in time after the data acquisition period.

11. The method of claim 1, further comprising:

receiving the data access command over a control channel of the interface.

12. The method of claim 1, wherein the step of compressing applies lossless compression or lossy compression in accordance with a compression control parameter selectable by a user.

13. The method of claim 1, wherein a compression control parameter provides an option for no compression selectable by a user, wherein the step of compressing is bypassed when the option for no compression is selected.

14. The method of claim 1, wherein the step of retrieving retrieves two or more compressed packets from the storage device, the step of mapping further comprising:

mapping two or more compressed packets to one data transmission packet.

15. An apparatus for data compression and storage in a rotatable part, the rotatable part mounted for rotation within a stationary part and having an interface between the stationary part and the rotatable part, wherein a plurality of sets of projection data are provided by a data acquisition source connected to the rotatable part, wherein each set of projection data corresponds to a view angle of rotation of the rotatable part and includes an array of samples acquired at a corresponding view during a data acquisition period, the apparatus comprising:

a compressor located on the rotatable part coupled to receive the samples from the data acquisition source, the compressor forming compressed samples arranged in at least one compressed packet for each set of projection data, wherein each compressed packet contains the compressed samples of a corresponding portion of the projection data;

an access array containing a plurality of data access parameters corresponding to the plurality of compressed packets based on sizes of the compressed packets, wherein at least one index parameter is associated with the corresponding portion of the projection data for each of the plurality of compressed packets, and the access array associates data access parameters with the at least one index parameter of the corresponding portion of the projection data;

a storage device located on the rotatable part and coupled to the compressor, wherein a plurality of the compressed packets for the plurality of sets of projection data are stored during a controllable time period, wherein each of the compressed packets is stored at a corresponding location in the storage device that is accessible based on a packet location parameter, the storage device retrieving using a data access parameter from the access array, at least one of the compressed packets stored therein in accordance with the packet location parameter in response to a data access command; and a transmitter coupled to receive the compressed packet retrieved from the storage device, the transmitter mapping the compressed packet to at least one data transmission packet and transferring the data transmission packet over a communication channel of the interface to the stationary part.

16. The apparatus of claim 15, further comprising:
a controller coupled to the storage device, wherein the controller provides the data access command in a format compatible with an industry standard protocol for storage device access.

17. The apparatus of claim 15, wherein the storage device responds to the data access command in accordance with an industry standard protocol for storage device access.

18. The apparatus of claim 15, further comprising:
a compression controller located on the rotatable part and providing a compression control parameter to the compressor, wherein the compression controller is responsive to a user input to select the compression control parameter.

19. The apparatus of claim 18, wherein the compressor applies lossless or lossy compression in accordance with the compression control parameter.

20. The apparatus of claim 18, wherein the compression control parameter provides an option for no compression selectable by the user input, wherein operations of the compressor are bypassed when the option for no compression is selected.

21. The apparatus of claim 18, wherein the compression controller measures a characteristic of the compressed samples and adjusts the compression control parameter based on the measured characteristic.

22. The apparatus of claim 15, further comprising:
a controller located on the rotatable part and connected to the storage device, the controller determining the packet location parameter of the corresponding compressed packet using one or more data access parameters in the access array in accordance with the index parameter, wherein the corresponding compressed packet is retrieved from the storage device in accordance with the packet location parameter.

23. The apparatus of claim 22, wherein the access array is stored in a memory of the controller.

24. The apparatus of claim 15, wherein the access array is stored in the storage device.

25. The apparatus of claim 15, wherein the compressor is implemented in a field programmable gate array or a programmable processor.

26. The apparatus of claim 15, wherein the compressor further comprises:
a plurality of compression modules operating in parallel, each compression module receiving a corresponding subset of the array of samples for the corresponding view and forming a corresponding subset of the compressed samples.

27. The apparatus of claim 15, wherein the storage device comprises a plurality of storage units, the apparatus further comprising:
a demultiplexer having an input coupled to the compressor and a plurality of outputs, each output coupled to a corresponding storage unit, the demultiplexer separating the compressed samples into one or more portions, wherein each portion is directed to the corresponding storage unit; and
a controller connected to the rotatable part and coupled to the compressor and to the storage units, the controller coordinating the storage and retrieval of the compressed samples to and from the storage units.

28. The apparatus of claim 15, wherein the storage device comprises at least one solid state drive device.

29. The apparatus of claim 15, wherein the interface comprises a slip ring interface.

* * * * *